(12) United States Patent
Takahashi

(10) Patent No.: US 10,910,932 B2
(45) Date of Patent: Feb. 2, 2021

(54) ROTATING ELECTRIC MACHINE

(71) Applicant: DENSO CORPORATION, Kariya (JP)

(72) Inventor: Yuuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/530,163

(22) Filed: Aug. 2, 2019

(65) Prior Publication Data

US 2019/0356204 A1   Nov. 21, 2019

Related U.S. Application Data

(63) Continuation of application No. PCT/JP2018/003497, filed on Feb. 1, 2018.

(30) Foreign Application Priority Data

Feb. 2, 2017   (JP) .................................. 2017-017894

(51) Int. Cl.
*H02K 21/04* (2006.01)
*H02K 1/22* (2006.01)
*H02K 1/24* (2006.01)

(52) U.S. Cl.
CPC ............ *H02K 21/044* (2013.01); *H02K 1/22* (2013.01); *H02K 1/226* (2013.01); *H02K 1/243* (2013.01);
(Continued)

(58) Field of Classification Search
CPC .......... H02K 1/22; H02K 1/226; H02K 1/243; H02K 21/04; H02K 21/046; H02K 21/048
(Continued)

(56) References Cited

U.S. PATENT DOCUMENTS 6,703,759 B2 *   3/2004   Oohashi ................. H02K 1/243
                                                         310/263
2005/0088056 A1 *   4/2005   Kuribayashi ........ H02K 21/044
                                                         310/263
(Continued)

FOREIGN PATENT DOCUMENTS

EP            0924841 A1     6/1999
JP         H04-255451 A      9/1992
(Continued)

OTHER PUBLICATIONS

Taniguchi et al., English Machine Translation of WO199840959 (Year: 1998).*
(Continued)

*Primary Examiner* — Tulsidas C Patel
*Assistant Examiner* — Rashad H Johnson
(74) *Attorney, Agent, or Firm* — Oliff PLC

(57) ABSTRACT

In a rotating electric machine, a rotor includes a field core, a field coil and permanent magnets. The field core has a boss portion and claw-shaped magnetic pole portions. Each of the permanent magnets is arranged between one circumferentially-adjacent pair of the claw-shaped magnetic pole portions. A d-axis magnetic circuit and a magnet magnetic circuit share a magnetic path in at least parts thereof. Along the d-axis magnetic circuit, magnetic flux generated by the magnetomotive force of the field coil flows through the boss portion, one pair of the claw-shaped magnetic pole portions and a stator core. Along the magnet magnetic circuit, magnetic flux generated by the magnetic force of a corresponding one of the permanent magnets flows. The relationship of Ast>Af is satisfied, where Ast is a magnetic path cross-sectional area of a stator and Af is a magnetic path cross-sectional area of the rotor.

11 Claims, 15 Drawing Sheets

(52) U.S. Cl.
CPC ......... *H02K 21/046* (2013.01); *H02K 21/048* (2013.01); *H02K 2213/03* (2013.01)

(58) Field of Classification Search
USPC ............. 310/156.01, 156.66, 156.68, 156.69
See application file for complete search history.

(56) References Cited

U.S. PATENT DOCUMENTS

| | | | | |
|---|---|---|---|---|
| 2009/0218907 | A1* | 9/2009 | Kusase | ................ H02K 21/044 |
| | | | | 310/263 |
| 2011/0043068 | A1* | 2/2011 | Yoshizawa | ........... H02K 21/044 |
| | | | | 310/181 |
| 2016/0336821 | A1* | 11/2016 | Kudou | ................... H02K 1/243 |
| 2019/0131833 | A1 | 5/2019 | Takahashi et al. | |

FOREIGN PATENT DOCUMENTS

| | | | |
|---|---|---|---|
| JP | 2014-112983 A | 6/2014 | |
| WO | WO199840959 | * 9/1998 | ............. H02K 19/22 |

OTHER PUBLICATIONS

Apr. 10, 2018 International Search Report issued in International Application No. PCT/JP2018/003497.

\* cited by examiner

ROTATING ELECTRIC MACHINE

CROSS-REFERENCE TO RELATED APPLICATIONS

The present application is a continuation application of International Application No. PCT/JP2018/003497 filed on Feb. 1, 2018, which is based on and claims priority from Japanese Patent Application No. 2017-17894 filed on Feb. 2, 2017. The contents of these applications are hereby incorporated by reference in their entirety into the present application.

BACKGROUND

1 Technical Field

The present invention relates to rotating electric machines that are installed in, for example, vehicles and used as electric motors and electric generators.

2 Description of Related Art

Conventionally, automotive alternators have been known which include a Lundell rotor that has a field coil and a plurality of claw-shaped magnetic pole portions. The claw-shaped magnetic pole portions respectively form magnetic poles the polarities of which are alternately different in a circumferential direction.

SUMMARY

A first rotating electric machine according to the present disclosure includes: a stator having an armature coil wound on a stator core; and a rotor provided rotatably and having a field coil configured to be energized via brushes. The rotor includes: a field core having a cylindrical boss portion on which the field coil is wound and a plurality of claw-shaped magnetic pole portions located on the stator side of the boss portion, the claw-shaped magnetic pole portions respectively forming magnetic poles polarities of which are alternately different in a circumferential direction; and a plurality of permanent magnets each of which is arranged between one circumferentially-adjacent pair of the claw-shaped magnetic pole portions with its axis of easy magnetization oriented in the circumferential direction, each of the permanent magnets having magnetic poles formed therein so as to match the polarities induced in the pair of claw-shaped magnetic pole portions by magnetomotive force of the field coil. A d-axis magnetic circuit and a magnet magnetic circuit share a magnetic path in at least parts thereof. Along the d-axis magnetic circuit, magnetic flux generated by the magnetomotive force of the field coil flows through the boss portion, one pair of the claw-shaped magnetic pole portions and the stator core. Along the magnet magnetic circuit, magnetic flux generated by magnetic force of a corresponding one of the permanent magnets flows. The relationship of Ast>Af is satisfied, where Ast is a magnetic path cross-sectional area of the stator and Af is a magnetic path cross-sectional area of the rotor.

A second rotating electric machine according to the present disclosure includes: a stator having an armature coil wound on a stator core; and a rotor provided rotatably and having a field coil configured to be energized via brushes. The rotor includes: a field core having a cylindrical boss portion on which the field coil is wound and a plurality of claw-shaped magnetic pole portions located on the stator side of the boss portion, the claw-shaped magnetic pole portions respectively forming magnetic poles polarities of which are alternately different in a circumferential direction; and a plurality of permanent magnets each of which is arranged between one circumferentially-adjacent pair of the claw-shaped magnetic pole portions with its axis of easy magnetization oriented in the circumferential direction, each of the permanent magnets having magnetic poles formed therein so as to match the polarities induced in the pair of claw-shaped magnetic pole portions by magnetomotive force of the field coil. The relationship of $1.0<Ast/Af<1.6$ is satisfied, where Af is a magnetic path cross-sectional area of the rotor and Ast is a magnetic path cross-sectional area of the stator. Moreover, the relationship of $Af \leq As$ is satisfied, where Af is the magnetic path cross-sectional area of the rotor and As is the area of a surface of each of the claw-shaped magnetic pole portions via which the claw-shaped magnetic pole portion exchanges magnetic flux with the stator core.

A third rotating electric machine according to the present disclosure includes: a stator having an armature coil wound on a stator core; a rotor rotatably arranged to radially face the stator; and a housing that receives therein and supports the stator and the rotor. The housing has a boss portion which is located on a radially opposite side to the stator and on which a field coil is wound. The rotor includes: a field core having a plurality of magnetic pole portions located closer than the field coil to the stator, the magnetic pole portions respectively forming magnetic poles polarities of which are alternately different in a circumferential direction; and a plurality of permanent magnets each of which is arranged between one circumferentially-adjacent pair of the magnetic pole portions with its axis of easy magnetization oriented in the circumferential direction, each of the permanent magnets having magnetic poles formed therein so as to match the polarities induced in the pair of magnetic pole portions by magnetomotive force of the field coil. A d-axis magnetic circuit and a magnet magnetic circuit share a magnetic path in at least parts thereof. Along the d-axis magnetic circuit, magnetic flux generated by the magnetomotive force of the field coil flows through the boss portion, one pair of the magnetic pole portions and the stator core. Along the magnet magnetic circuit, magnetic flux generated by magnetic force of a corresponding one of the permanent magnets flows. The relationship of $Af<As$ is satisfied, where Af is a magnetic path cross-sectional area of the rotor and As is the area of a surface of each of the magnetic pole portions via which the magnetic pole portion exchanges magnetic flux with the stator core. Moreover, the relationship of Ast>Af is satisfied, where Ast is a magnetic path cross-sectional area of the stator and Af is the magnetic path cross-sectional area of the rotor.

A fourth rotating electric machine according to the present disclosure includes: a stator having an armature coil wound on a stator core; a rotor rotatably arranged to radially face the stator; and a housing that receives therein and supports the stator and the rotor. The housing has a boss portion which is located on a radially opposite side to the stator and on which a field coil is wound. The rotor includes: a field core having a plurality of magnetic pole portions located closer than the field coil to the stator, the magnetic pole portions respectively forming magnetic poles polarities of which are alternately different in a circumferential direction; and a plurality of permanent magnets each of which is arranged between one circumferentially-adjacent pair of the magnetic pole portions with its axis of easy magnetization oriented in the circumferential direction, each of the permanent magnets having magnetic poles formed therein so as to match the polarities induced in the pair of magnetic pole portions by magnetomotive force of the field coil. The relationship of 1.0<Ast/Af<1.6 is satisfied, where Af is a magnetic path cross-sectional area of the rotor and Ast is a magnetic path cross-sectional area of the stator. Moreover, the relationship of Af<As is satisfied, where Af is the magnetic path cross-sectional area of the rotor and As is the area of a surface of each of the magnetic pole portions via which the magnetic pole portion exchanges magnetic flux with the stator core.

DESCRIPTION OF EMBODIMENTS

Figure 1:
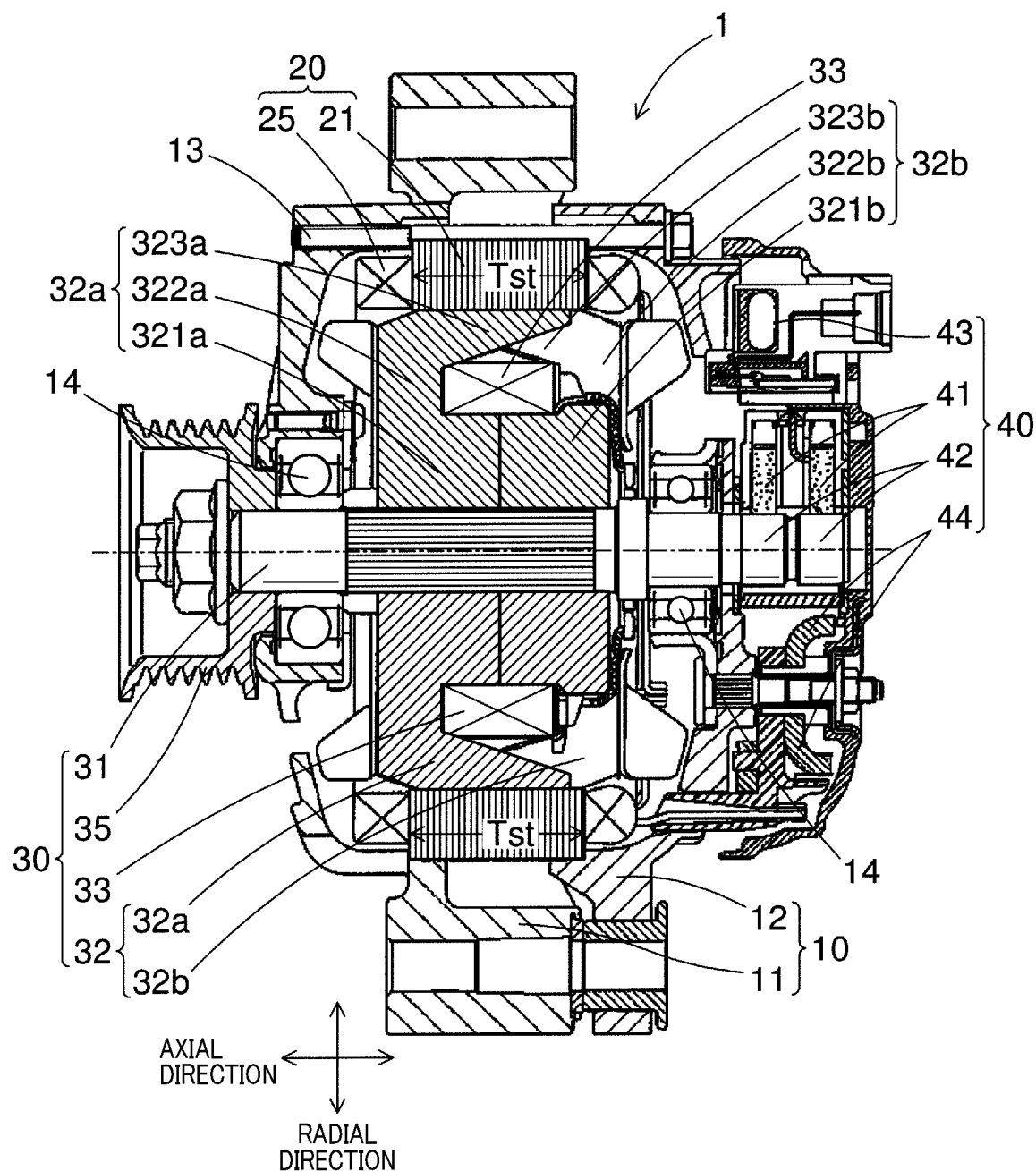
FIG. 1 is a cross-sectional view, along an axial direction, of a rotating electric machine according to a first embodiment.

In Japanese Patent Application Publication No. JPH04255451A (to be referred to as Patent Document 1 hereinafter), there is disclosed an automotive alternator which includes a Lundell rotor with magnets; in this rotor, permanent magnets are interposed between circumferentially-adjacent claw-shaped magnetic pole portions, so as to achieve a higher output density. In such an electric generator, the size of the permanent magnets and the boss portion, disc portions and claw-shaped magnetic pole portions of the Lundell rotor core are optimally designed, so as to achieve both improvement in the electric power generation capability and reduction in the counterelectromotive force.

In Patent Document 1, there is described a formula that is derived by determining the relationship between: magnetic flux of the permanent magnets (hereinafter, to be referred to as "magnet magnetic flux") that causes an inflection point of the electric generator output characteristics; and various constants of the claw-shaped magnetic pole pieces (i.e., claw-shaped magnetic pole portions) (specifically, the magnetic pole piece length L, the longer-side length W on the proximal side and the magnetic skew angle θ). Upon determination of the various constants, it is possible to uniformly determine the residual magnetic flux density Br of the permanent magnets. According to the technique described in Patent Document 1, it is possible to set the magnetic poles so as to universally achieve, under different electric-generator specifications, avoidance of overcharge of a battery as well as both high efficiency and high output.

In recent years, with employment of slant-nose designs for reducing the vehicle running resistance and reduction in the sizes of engine compartments, the installation spaces of vehicular electric generators and starters have been minimized. In this case, as capabilities of vehicular electric generators considered as being important, there are added the function as a starter and high-efficiency propulsion and regenerative operations for assisting the vehicles. Consequently, the number of cases where improvement in only the electric power generation capability is required has been reduced. Hence, the electric power generation, torque and regenerative capability of electric generators when the field current becomes high in a short time have attracted attention.

In the Lundell rotor disclosed in Patent Document 1, there are formed at least two parallel magnetic circuits, i.e., a magnetic circuit formed by the permanent magnets and a magnetic circuit formed by the field core. That is, the Lundell rotor is of a type that employs both permanent magnets and an electromagnet. As disclosed in Patent Document 1, the Lundell rotor is capable of lowering the counterelectromotive force generated in the field coil. Let Ke [Vs/rad] be the counterelectromotive force constant and ω [rad] be the angular frequency. Then, the counterelectromotive force Ve [V] can be expressed by the following formula (1).

$$Ve \propto Ke \times \omega \quad (1)$$

Here, it can be seen that in Patent Document 1, outside a suitable range, the generated electric current Ig under load still increases. Let Vb [V] be the battery voltage and Z [Ω] be the impedance. Then, the generated electric current Ig [A] can be expressed by the following formula (2).

$$Ig = (Ve - Vb)/Z \quad (2)$$

It can be seen that in Patent Document 1, for reducing the generated electric current Ig during a non-electric power generation operation, the counterelectromotive force constant Ke is lowered, thereby sacrificing the generated electric current Ig under load.

Figure 19:
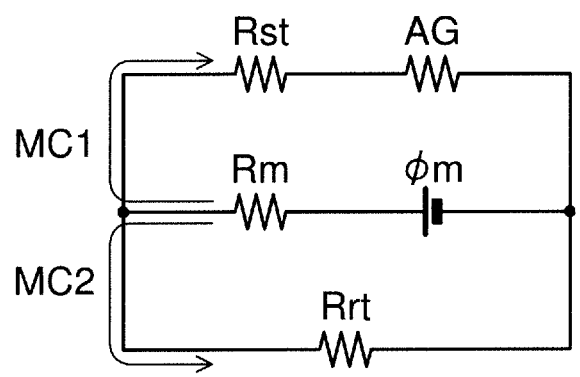
FIG. 19 is a diagram illustrating a magnetic equivalent circuit of a Lundell rotor with magnets.
Figure 20:
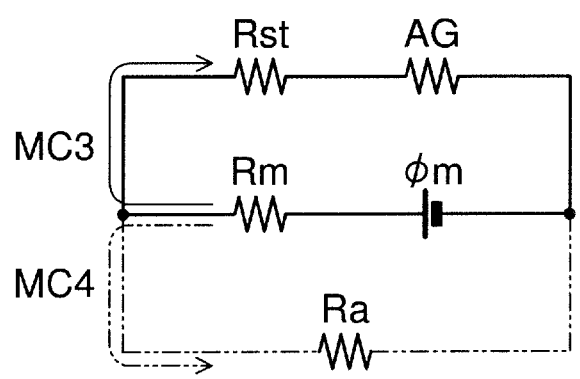
FIG. 20 is a diagram illustrating a magnetic equivalent circuit of an IPM rotor.

FIG. 19 shows a magnetic equivalent circuit of a Lundell rotor with magnets. FIG. 20 shows a magnetic equivalent circuit of an IPM (Interior Permanent Magnet) rotor having permanent magnets embedded therein; the magnetic equivalent circuit is suitable for guiding the magnet magnetic flux to the stator side under load (i.e., when the rotor is under load). In FIGS. 19 and 20, φm represents the magnet magnetic flux; Rm represents the magnetic reluctance of air gaps between the magnetic pole portions; Rst represents the magnetic reluctance of the stator; AG represents the magnetic reluctance of an air gap between the rotor and the stator; Rrt represents the magnetic reluctance of the rotor; and Ra represents the magnetic reluctance of an air-gap portion of the d-axis circuit. As shown in FIG. 19, in the case of a Lundell rotor with magnets, the magnet magnetic flux φm is distributed to form two magnetic circuits, i.e., a magnetic circuit MC1 through the stator core and a magnetic circuit MC2 through the boss portion of the Lundell rotor core.

On the other hand, as shown in FIG. 20, in the case suitable for guiding the magnet magnetic flux to the stator side under load, a first magnet magnetic circuit 38, which is shown with a one-dot chain line in FIG. 9 to be described later, includes the air gap G in its route. The air gap G corresponds to the air-gap portion described above. Therefore, the magnetic reluctance Ra of a magnetic circuit MC4 shown in FIG. 20 is very high, whereas the magnetic reluctance Rst of a magnetic circuit MC3 shown in FIG. 20 is very low. Such a difference in magnetic reluctance is the cause of the difference in motor capability between a Lundell rotor with magnets and an IPM rotor. That is, setting the magnetic reluctance Rrt to be very high with respect to the magnetic reluctance Rst under load and thereby creating a state where the inductance Lrt of the rotor is very low with respect to the inductance Lst of the stator, it is possible to have the capability of the magnets included in the Lundell rotor effectively applied to the stator side.

As a result of repeating earnest research based on the above idea, the inventor of the present application has found that it is possible for a Lundell rotor with magnets to output, by utilizing field current flowing in a field coil, torque at the same level as that outputted by an IPM rotor. That is, in the rotor magnetic circuit suitable for an IPM rotor under load, the magnetic reluctance of the field core is high whereas the magnetic reluctance of the stator core is low. In a Lundell rotor with magnets, raising the magnetic reluctance value of the field core to be larger than the magnetic reluctance value of the stator core when the field current flows in the field coil, the same situation occurs as in the magnetic circuit suitable for an IPM rotor under load.

Here, let Lrt [H] be the inductance of the rotor and Lst [H] be inductance of the stator. Moreover, let Rrt [A/Wb] be the magnetic reluctance of the rotor to the magnetic flux flowing through the rotor and Rst [A/Wb] be the magnetic reluctance of the stator to the magnetic flux flowing through the stator. In a Lundell rotor with magnets, satisfying the relationships of the following formulas (3) and (4) when the rotor is under load, it is possible to create the same situation as in the magnetic circuit suitable for an IPM rotor under load.

$$Lrt < Lst \quad (3)$$

$$Rrt > Rst \quad (4)$$

Moreover, let Br be the residual magnetic flux density of the magnets, Am [mm$^2$] be the magnetic path cross-sectional area of each of the magnetic pole portions of the permanent magnets, Bs [Wb/mm$^2$] be the magnetic flux density of the stator and Af [mm$^2$] be the magnetic path cross-sectional area of the rotor. Then, it is preferable to satisfy all of the relationships of the following formulas (5), (6) and (7) when no load is applied to the rotor. In particular, it is preferable to satisfy the relationship of the formula (7), which is a condition when the counterelectromotive force Ve is lower than the battery voltage Vb.

$$Lrt > Lst \quad (5)$$

$$Rrt < Rst \quad (6)$$

$$2 \times Br \times Am < Bs \times Af \quad (7)$$

However, in a completed rotating electric machine such as a traction motor or an electric generator, it is impossible to easily measure the magnetic reluctances Rrt and Rst included in the above formulas (4) and (6). Moreover, the inductances L vary with the number of turns (more specifically, the square of the number of turns N) and thus it is not appropriate to evaluate the magnitude relationship therebetween. Therefore, in the evaluation described hereinafter, permeance is used which can be easily measured and calculated by an experimental method to be described later.

Permeance P [H] is the reciprocal of magnetic reluctance R [A/Wb] and satisfies the relationship of the following formula (8).

$$P=1/R=L/N^2 \qquad (8)$$

Let Prt be the permeance of a d-axis magnetic circuit and Pst be the permeance of a q-axis magnetic circuit. The inventor of the present application has found that designing a rotating electric machine, where the resultant magnetic flux of two magnetic fluxes flows along the d axis, to satisfy Prt<Pst under load, it is possible for the rotating electric machine to behave as a suitable magnetic circuit when the rotor is under load. The present invention has been accomplished based on the above finding by the inventor. In addition, the two magnetic fluxes here denote the magnet magnetic flux flowing along the aforementioned first magnet magnetic circuit 38 and field magnetic flux that is generated by the magnetomotive force of the field coil to flow along the d-axis magnetic circuit.

Here, let R [A/Wb] be the magnetic reluctance, ML [mm] be the magnetic path length, μs be the relative permeability, μ0 be the vacuum permeability and A [mm²] be the magnetic path cross-sectional area. Then, the following formula (9) is satisfied. Moreover, the formula (9) can be transformed into the following formula (10) using a coefficient K, where K=(μ0×μs)/ML.

$$R=ML/(\mu 0 \times \mu s \times A) \qquad (9)$$

$$P=1/R=(\mu 0 \times \mu s \times A)/ML=K \times A \qquad (10)$$

From the above formula (10), it is clear that the permeance P can be increased by increasing the magnetic path cross-sectional area A. Accordingly, to have the permeance Prt of the d-axis magnetic circuit and the permeance Pst of the q-axis magnetic circuit satisfying the relationship of Prt<Pst, the magnetic path cross-sectional area Ast of the stator and the magnetic path cross-sectional area Af of the rotor may be set to satisfy the relationship of Ast>Af.

In the above-described first rotating electric machine according to the present disclosure, by each of the permanent magnets which is arranged between one circumferentially-adjacent pair of the claw-shaped magnetic pole portions, there are formed both a first magnet magnetic circuit along which the magnetic flux flows to cross the stator and a second magnet magnetic circuit along which the magnetic flux flows through the boss portion and the flow of the magnetic flux is completed within the rotor. Moreover, when the rotor is under load, i.e., when the field current is supplied to the field coil, there is formed the d-axis magnetic circuit along which the magnetic flux generated by the magnetomotive force of the field coil flows through the boss portion of the field core, one pair of the claw-shaped magnetic pole portions and the stator core. At this time, the direction of the magnet magnetic flux flowing along the second magnet magnetic circuit is opposite to the direction of the magnetic flux flowing along the d-axis magnetic circuit; therefore, the magnetic reluctance of the second magnet magnetic circuit is high and thus it difficult for the magnet magnetic flux to flow through the second magnet magnetic circuit. Since the magnetic path cross-sectional area Ast of the stator and the magnetic path cross-sectional area Af of the rotor satisfy the relationship of Ast>Af, the permeance Prt of the d-axis magnetic circuit and the permeance Pst of the q-axis magnetic circuit accordingly satisfy the relationship of Prt<Pst. Therefore, the magnet magnetic flux flowing along the first magnet magnetic circuit is increased. Consequently, it becomes possible to cause the magnet magnetic flux of the permanent magnets to cross the stator, thereby effectively utilizing the magnet magnetic flux. As a result, it becomes possible to significantly improve the electric power generation capability of the first rotating electric machine.

The expression "when the rotor is under load" denotes a state of the rotor where the field current If, which is supplied as rated current to the field coil, is in the range of 4-20 [A]; this range is a general range in consideration of the capability of brushes. In addition, the field current If might be set to a value (e.g., 30 [A] or 50 [A]) higher than 20 [A] with future progress in brushes. In terms of satisfying the relationship of Prt<Pst with the present brushes, the effects of satisfying the relationship of the area of the surface of each of the claw-shaped magnetic pole portions for exchanging magnetic flux with the stator core being greater than the magnetic path cross-sectional area of the rotor are significant.

In a further implementation of the above-described first rotating electric machine, the relationship of Af<As is satisfied, where Af is the magnetic path cross-sectional area of the rotor and As is the area of a surface of each of the claw-shaped magnetic pole portions via which the claw-shaped magnetic pole portion exchanges magnetic flux with the stator core.

With the above configuration, the area As of the surface of each of the claw-shaped magnetic pole portions for exchanging magnetic flux with the stator core is greater than the magnetic path cross-sectional area Af of the rotor. Consequently, it becomes possible to reliably perform exchange of the magnet magnetic flux of the permanent magnets between the stator and the rotor.

In another further implementation of the above-described first rotating electric machine, the relationship of 2×Br× Am<B50×Ab is satisfied, where Ab is a magnetic path cross-sectional area of the boss portion per pole pair, B50 is magnetic flux density when a magnetic field of 5000 [A/m] is applied to the boss portion, Br is residual magnetic flux density of the permanent magnets and Am is a magnetic path cross-sectional area of each of magnetic pole portions of the permanent magnets.

With the above configuration, it becomes possible to effectively short-circuit the magnet magnetic flux of the permanent magnets to the boss portion side, thereby suppressing the electric power generation when no load is applied to the rotor.

In the above-described second rotating electric machine according to the present disclosure, the area As of the surface of each of the claw-shaped magnetic pole portions for exchanging magnetic flux with the stator core and the magnetic path cross-sectional area Af of the rotor satisfy the relationship of Af≤As. Moreover, the magnetic path cross-sectional area Af of the rotor and the magnetic path cross-sectional area Ast of the stator satisfy the relationship of 1.0<Ast/Af<1.6. Satisfying these relationships, it is possible to cause the magnetic path of the rotor with the magnetic path cross-sectional area Af to be sufficiently magnetically saturated. Meanwhile, it is possible to have the magnetic path of the stator with the magnetic path cross-sectional area Ast remaining unsaturated; therefore, it is possible increase the magnet magnetic flux crossing the stator. Consequently, it becomes possible to effectively utilize the magnet magnetic flux of the permanent magnets, thereby significantly improving the capability of the second rotating electric machine as a motor-generator. In addition, in the prior art, permanent magnets arranged between claw-shaped magnetic pole portions are used for rectification or leakage prevention of magnetic flux. In contrast, in the second rotating electric machine, the permanent magnets arranged between the claw-shaped magnetic pole portions function, similarly to permanent magnets provided in an IPM motor, to increase the magnetic flux flowing to the stator as well as to prevent leakage of the magnetic flux. That is, the magnet magnetic flux of the permanent magnets contributes to improvement of the counterelectromotive force (i.e., power generation output) and improvement of the torque.

In the above-described third rotating electric machine according to the present disclosure, by each of the permanent magnets which is arranged between one circumferentially-adjacent pair of the magnetic pole portions, there are formed both a first magnet magnetic circuit along which the magnetic flux flows to cross the stator and a second magnet magnetic circuit along which the magnetic flux flows through the boss portion and the flow of the magnetic flux is completed within the rotor. Moreover, when the rotor is under load, i.e., when the field current is supplied to the field coil, there is formed the d-axis magnetic circuit along which the magnetic flux generated by the magnetomotive force of the field coil flows through the boss portion of the field core, one pair of the magnetic pole portions and the stator core. At this time, the direction of the magnet magnetic flux flowing along the second magnet magnetic circuit is opposite to the direction of the magnetic flux flowing along the d-axis magnetic circuit; therefore, the magnetic reluctance of the second magnet magnetic circuit is high and thus it difficult for the magnet magnetic flux to flow through the second magnet magnetic circuit. Since the magnetic path cross-sectional area Ast of the stator and the magnetic path cross-sectional area Af of the rotor satisfy the relationship of Ast>Af, the permeance Prt of the d-axis magnetic circuit and the permeance Pst of the q-axis magnetic circuit accordingly satisfy the relationship of Prt<Pst. Therefore, the magnet magnetic flux flowing along the first magnet magnetic circuit is increased. Consequently, it becomes possible to effectively utilize the magnet magnetic flux of the permanent magnets, thereby significantly improving the capability of the third rotating electric machine as a motor-generator.

In the above-described fourth rotating electric machine according to the present disclosure, the area As of the surface of each of the magnetic pole portions for exchanging magnetic flux with the stator core and the magnetic path cross-sectional area Af of the rotor satisfy the relationship of Af≤As. Moreover, the magnetic path cross-sectional area Af of the rotor and the magnetic path cross-sectional area Ast of the stator satisfy the relationship of 1.0<Ast/Af<1.6. Satisfying these relationships, it is possible to cause the magnetic path of the rotor with the magnetic path cross-sectional area Af to be sufficiently magnetically saturated. Meanwhile, it is possible to have the magnetic path of the stator with the magnetic path cross-sectional area Ast remaining unsaturated; therefore, it is possible increase the magnet magnetic flux crossing the stator. Consequently, it becomes possible to effectively utilize the magnet magnetic flux of the permanent magnets, thereby significantly improving the capability of the fourth rotating electric machine as a motor-generator. In addition, in the prior art, permanent magnets arranged between magnetic pole portions are used for rectification or leakage prevention of magnetic flux. In contrast, in the fourth rotating electric machine, the permanent magnets arranged between the magnetic pole portions function, similarly to permanent magnets provided in an IPM motor, to increase the magnetic flux flowing to the stator as well as to prevent leakage of the magnetic flux. That is, the magnet magnetic flux of the permanent magnets contributes to improvement of the counterelectromotive force (i.e., power generation output) and improvement of the torque.

In a further implementation of the above-described first, second, third and fourth rotating electric machines, the stator core has a back yoke (24) and a plurality of teeth (23) radially extending from the back yoke to the rotor side. The relationship of 0.905<Din/Dout<0.938 is satisfied, where Dout is an outer diameter of the back yoke and Din is an inner diameter of the back yoke.

With the above configuration, when the rotor is under load, the permanent magnets of the rotor function, similarly to permanent magnets provided in an IPM motor, to increase the magnetic flux flowing to the stator. Consequently, it becomes possible to transfer both the total magnetic force of the boss portion and the total magnetic force of the permanent magnets to the stator side.

In a further implementation of the above-described first and third rotating electric machines, the relationship of Prt<Pst is satisfied when the rotor is under load, where Prt is permeance of the d-axis magnetic circuit and Pst is permeance of a q-axis magnetic circuit (37). The q-axis magnetic circuit is formed by electric current flowing in the armature coil and extends through a q axis that is located at a position offset from the d axis by 90° in electrical angle.

With the above configuration, the permeance prt of the d-axis magnetic circuit and the permeance Pst of the q-axis magnetic circuit are set to satisfy the relationship of Prt<Pst. Therefore, the magnet magnetic flux flowing along the first magnet magnetic circuit is increased. Consequently, it becomes possible to effectively utilize the magnet magnetic flux of the permanent magnets, thereby significantly improving the capabilities of the first and third rotating electric machines as a motor-generator. In particular, in the third rotating electric machine which has a brushless configuration, if there is no limit on the field current If, it may be possible to satisfy the relationship of Prt<Pst even with higher field current If.

In addition, "armature coil" is also referred to as stator coil. A "rotating electric machine" may be, for example, an electric generator, an electric motor or a motor-generator. The "stator magnetic path cross-sectional area" is the minimum cross-sectional area of magnetic paths of the stator (e.g., back yoke and teeth) forming magnetic circuits. The "rotor magnetic path cross-sectional area" is the minimum cross-sectional area of magnetic paths of the rotor (e.g., boss portion and disc portions) forming magnetic circuits. Since one pole pair denotes "one pair of N and S poles", the "magnetic path cross-sectional area of the boss portion per pole pair" is represented by the value obtained by dividing the total magnetic path cross-sectional area of the boss portion by the number of pole pairs.

Hereinafter, exemplary embodiments and their modifications will be described with reference to FIGS. 1-31. In addition, unless specified otherwise, the symbol denotes being approximately equal, which encompasses error ranges such as manufacturing tolerances, design tolerances and errors causing no problem in practice. Units are enclosed in square brackets. For example, the unit of electric current is ampere [A], and the unit of magnetomotive force is ampere-turn [AT].

First Embodiment

The first embodiment will be described with reference to FIGS. 1-22. A rotating electric machine according to the present embodiment is an automotive alternator 1 that is installed in a vehicle and used as an electric generator. In addition, it should be noted that: FIG. 4 is a schematic view, not a cross-sectional view; however, for the sake of convenience of explanation, portions representing areas are shown with hatch lines in FIG. 4.

(Overall Configuration of Automotive Alternator)

As shown in FIG. 1, the automotive alternator 1 is of a structure which includes brushes. The automotive alternator 1 includes a housing 10, a stator 20, a rotor 30, a field coil energization device 40 and a rectifier 44.

The housing 10 mainly includes a front housing 11 and a rear housing 12. The housing 10 receives therein and supports bearings 14, the stator 20, the rotor 30, the field coil energization device 40 and the rectifier 44. In the present embodiment, the front and rear housings 11 and 12 are each formed in a bottomed cylindrical shape having one end open. The front and rear housings 11 and 12 are fastened together, by bolts 13, with the open ends thereof abutting each other.

The stator 20 includes a stator core 21, a plurality of slots 22, a plurality of teeth 23 and an armature coil (or stator coil) 25. The stator core 21 is an annular soft-magnetic body. The plurality of slots 22 and the plurality of teeth 23 are alternately arranged along a circumferential direction of the stator core 21. The armature coil 25 is a multi-phase coil (more particularly, three-phase coil in the present embodiment). The armature coil 25 is wound in the slots 22. In the present embodiment, the stator 20 is fixed, in a state of being axially sandwiched, to inner circumferential surfaces of circumferential walls of the front and rear housings 11 and 12.

The rotor 30 includes a rotating shaft 31, a field core 32, a field coil 33 and a plurality of permanent magnets 34. The rotor 30 is driven to rotate by an engine (not shown) of the vehicle via a pulley 35 that is fixed to a front end portion (i.e., left end portion in FIG. 1) of the rotating shaft 31.

The rotating shaft 31 is rotatably supported by the housing 10 via the pair of bearings 14. The field core 32, which is of the Lundell type, consists of a pair of a first pole core 32a and a second pole core 32b; the first and second pole cores 32a and 32b are fitted and fixed on an outer periphery of the rotating shaft 31. Consequently, the rotating shaft 31, the field core 32 and the pulley 35 rotate at the same rotational speed.

The field core 32 has a boss portion 321, a pair of disc portions 322 and a plurality of claw-shaped magnetic pole portions 323. The boss portion 321 is a cylindrical portion which is located on the radially opposite side to the stator 20 and through which field magnetic flux axially flows. Each of the disc portions 322 is an overall annular portion which extends radially outward (i.e., to the stator 20 side) from a corresponding axial end part of the boss portion 321 and through which the field magnetic flux radially flows. In the present embodiment, each of the disc portions 322 consists of a plurality (e.g., 8) of sections that are spaced at equal intervals in the circumferential direction. The claw-shaped magnetic pole portions 323 are provided at a predetermined pitch in the circumferential direction. The claw-shaped magnetic pole portions 323 axially extend respectively radially outer end parts of the corresponding disc portions 322 so as to surround the field coil 33. The claw-shaped magnetic pole portions 323 exchange magnetic flux with the stator core 21. The field coil 33 is wound on a radially outer periphery of the boss portion 321. Each of the permanent magnets 34 is arranged between one circumferentially-adjacent pair of the claw-shaped magnetic pole portions 323. Each of magnetic pole portions of the permanent magnets 34 has a magnetic path cross-sectional area Am for exchanging magnetic flux with the corresponding claw-shaped magnetic pole portion 323; the magnetic path cross-sectional area Am is shown with cross-hatch lines in, for example, FIG. 3. In addition, it should be noted that for the sake of convenience, in FIG. 3, the cross-hatch lines are depicted on a viewable part of one of the magnetic pole portions of the permanent magnets 34.

Figure 2:
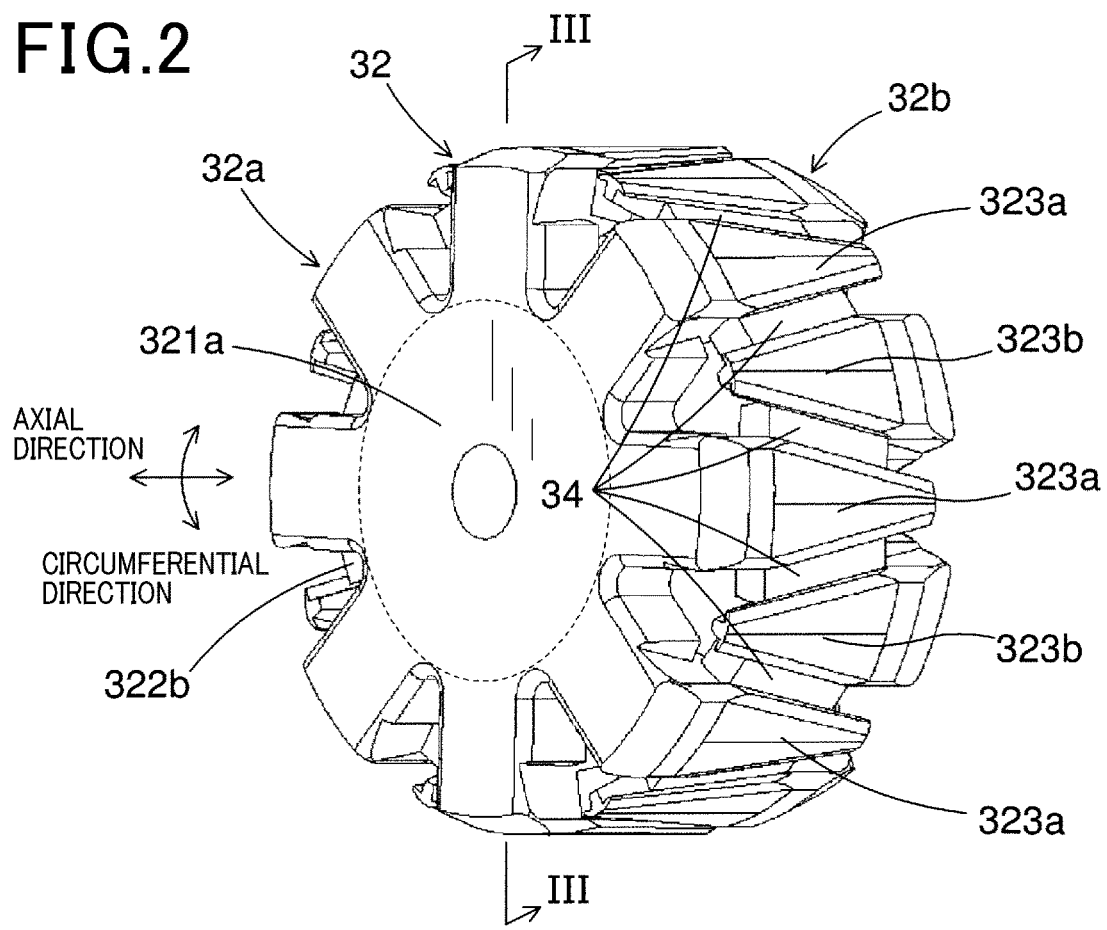
FIG. 2 is a perspective view of a field core of the rotating electric machine according to the first embodiment.

As shown in FIGS. 1 and 2, the first pole core 32a is a soft-magnetic body which is fixed on a front part (i.e., left part in FIG. 1) of the rotating shaft 31. The first pole core 32a has a first boss portion 321a, a first disc portion 322a and a plurality of first claw-shaped magnetic pole portions 323a. The first boss portion 321a corresponds to one half of the boss portion 321 of the field core 32. The first disc portion 322a corresponds to one of the pair of disc portions 322 of the field core 32. Each of the first claw-shaped magnetic pole portions 323a corresponds to one of the plurality of claw-shaped magnetic pole portions 323 of the field core 32.

As shown in FIGS. 1 and 2, the second pole core 32b is a soft-magnetic body which is fixed on a rear part (i.e., right part in FIG. 1) of the rotating shaft 31. The second pole core 32b has a second boss portion 321b, a second disc portion 322b and a plurality of second claw-shaped magnetic pole portions 323b. The second boss portion 321b corresponds to the other half of the boss portion 321 of the field core 32. The second disc portion 322b corresponds to the other of the pair of disc portions 322 of the field core 32. Each of the second claw-shaped magnetic pole portions 323b corresponds to one of the plurality of claw-shaped magnetic pole portions 323 of the field core 32.

In the present embodiment, the first pole core 32a and the second pole core 32b are identically shaped to each other. The first claw-shaped magnetic pole portions 323a and the second claw-shaped magnetic pole portions 323b are provided so as to extend toward opposite axial sides to each other.

In the present embodiment, the field core 32 is formed of two types of materials having different saturation flux densities Bs. Specifically, the boss portion 321 and the disc portions 322 are formed of a material whose saturation flux density Bs is low whereas the claw-shaped magnetic pole portions 323 are formed of a material which has a higher saturation flux density Bs than the boss portion 321 and the disc portions 322. As the material having the higher saturation flux density Bs, materials whose carbon content is about 0.1%, such as S10C according to JIS, may be employed. On the other hand, as the material having the lower saturation flux density Bs, materials whose carbon content is high, such as S45C according to JIS, may be employed. In addition, SUS430 according to JIS and magnetic steel sheets are lower in saturation flux density Bs than S10C.

Moreover, the material having the lower saturation flux density Bs is higher in magnetic permeability than the material having the higher saturation flux density Bs. In addition, materials which have high magnetic permeability may include, for example, Permalloy. On the other hand, iron having nickel and/or cobalt added thereto is high in magnetic permeability as well as in saturation flux density Bs; therefore it is unsuitable for use.

The first pole core 32a and the second pole core 32b are assembled together so that: the first claw-shaped magnetic pole portions 323a are interleaved with the second claw-shaped magnetic pole portions 323b; and an axial rear end face of the first pole core 32a and an axial front end face of the second pole core 32b are in surface contact with each other. Consequently, the first claw-shaped magnetic pole portions 323a of the first pole core 32a are arranged alternately with the second claw-shaped magnetic pole portions 323b of the second pole core 32b in the circumferential direction. The first pole core 32a and the second pole core 32b each have eight claw-shaped magnetic pole portions 323. One of the first pole core 32a and the second pole core 32b is magnetized into N poles while the other of the first pole core 32a and the second pole core 32b is magnetized into S poles. Consequently, the number of poles of the field core 32 is equal to 16; the number of pole pairs of the field core 32 is equal to 8.

Figure 3:
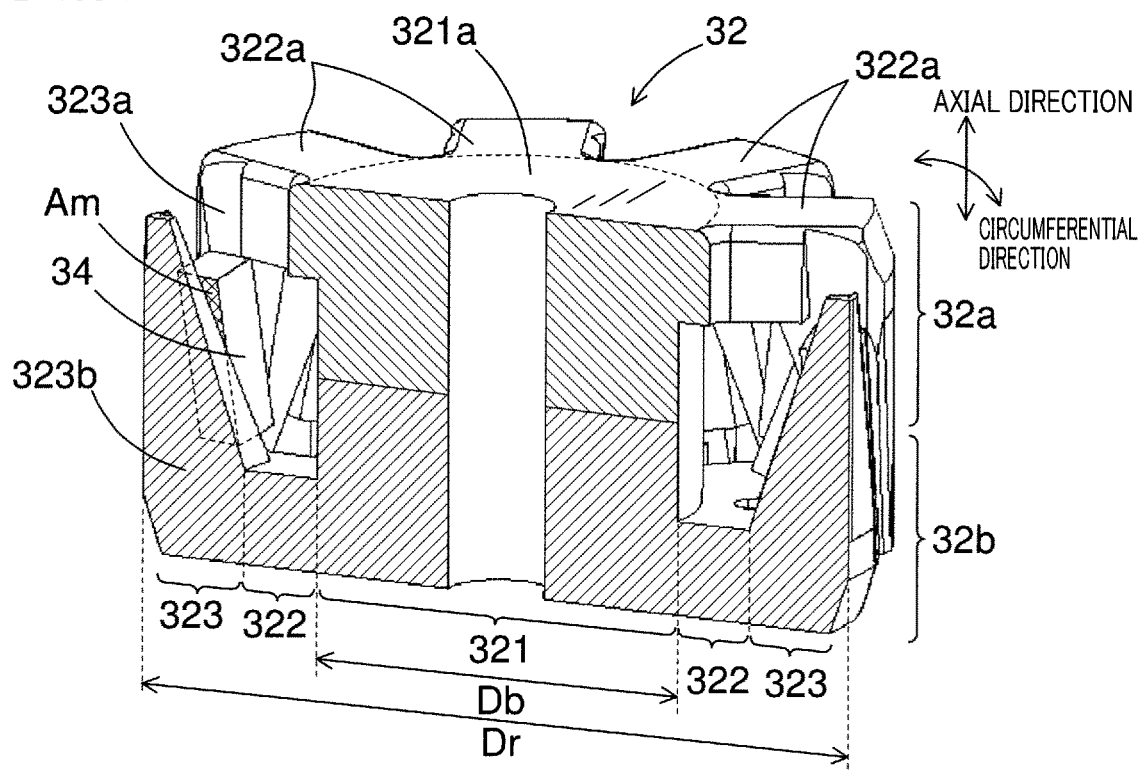
FIG. 3 is a partially cross-sectional perspective view of the field core of the rotating electric machine according to the first embodiment.
Figure 4:
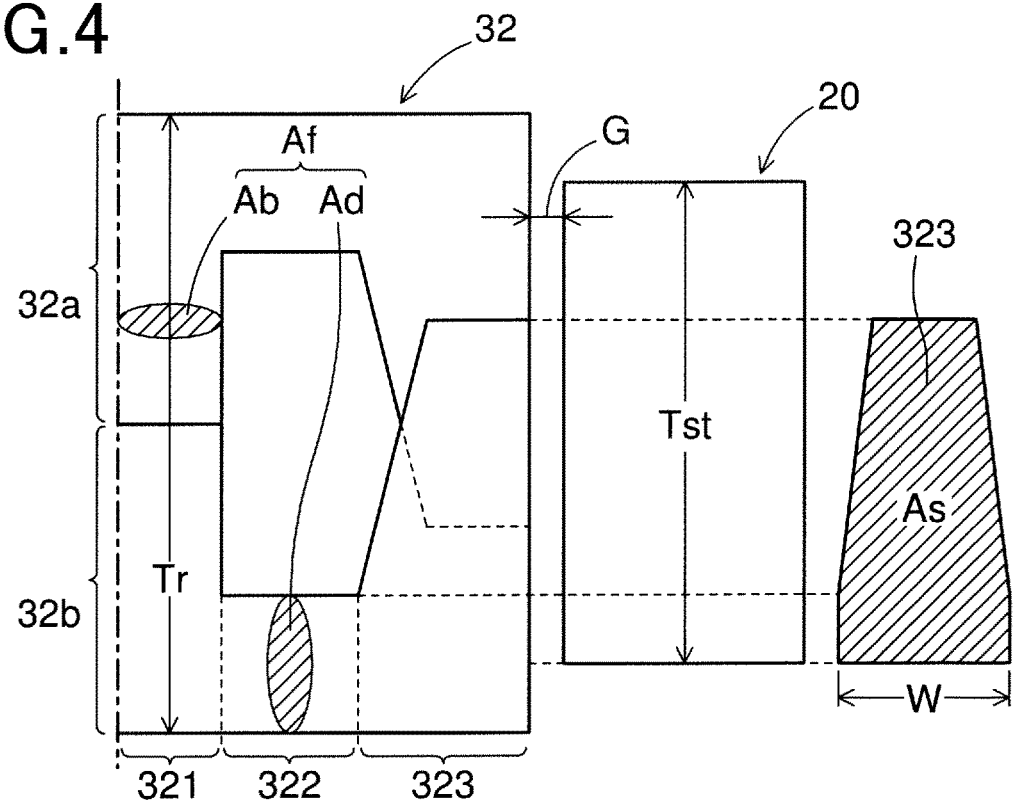
FIG. 4 is a schematic view illustrating dimensions of the field core of the rotating electric machine according to the first embodiment.

In the present embodiment, as shown in FIG. 3, the outer diameter of the boss portion 321 of the field core 32 is designated by Db (hereinafter, to be referred to as "boss portion outer diameter Db"), and the outer diameter of the rotor 30 (field core 32) is designated by Dr (hereinafter, to be referred to as "rotor outer diameter Dr"). Then, the relationship between the boss portion outer diameter Db and the rotor outer diameter Dr is specified to satisfy the following formula (11).

$$0.46 < Db/Dr < 0.53 \tag{11}$$

As shown with hatch lines in FIG. 4 for the sake of convenience, the area of the radially outer surface of each of the claw-shaped magnetic pole portions 323 is designated by As [mm²] (hereinafter, to be referred to as "magnetic pole portion surface area As"). As shown on the right side in FIG. 4, the magnetic pole portion surface area As represents that part of the surface area of each of the claw-shaped magnetic pole portions 323 which faces the stator 20.

Moreover, the magnetic path cross-sectional area of the boss portion 321 per pole pair is designated by Ab [mm²] (hereinafter, to be referred to as "boss portion cross-sectional area Ab"). The boss portion cross-sectional area Ab is represented by the value obtained by dividing the area of a minimum cross section of the boss portion 321, which is taken along the radial direction, by the number of pole pairs. Here, let A be the area of the minimum cross section of the boss portion 321 taken along the radial direction (i.e., vertical direction in FIG. 1), and Np be the number of pole pairs of the field core 32. Then, the boss portion cross-sectional area Ab can be expressed by the following formula (12). In addition, Np=8 in the present embodiment.

$$Ab = A/Np \tag{12}$$

Furthermore, the cross-sectional area of each of the claw-shaped magnetic pole portions 323 at its root (proximal end) is designated by At [mm²] (hereinafter, to be referred to as "root cross-sectional area At"). The root cross-sectional area At is represented by the area of a cross section of each of the claw-shaped magnetic pole portions 323 which is taken at the root of the claw-shaped magnetic pole portion 323 along the radial direction (i.e., horizontal direction in FIG. 4). In addition, the root cross-sectional area At may be represented by the area of a minimum one of cross sections of that part of the claw-shaped magnetic pole portion 323 which is not taken into account for the magnetic pole portion surface area As; the cross sections are perpendicular to the flow of magnetic flux.

Of the cross-sectional areas shown in FIG. 4, the relationship between the magnetic pole portion surface area A and the boss portion cross-sectional area Ab is specified to satisfy the following formula (13).

$$0.9 < As/Ab < 1.7 \tag{13}$$

The magnetic path cross-sectional area of the rotor 30 is designated by Af [mm²] (hereinafter, to be referred to as "magnetic path cross-sectional area Af"). The magnetic path cross-sectional area Af is represented by the minimum magnetic path cross-sectional area of magnetic circuits formed in the rotor 30. More specifically, the magnetic path cross-sectional area Af is represented by the minimum one of the boss portion cross-sectional area Ab and the disc portion cross-sectional area Ad shown in FIG. 4.

The relationship between the magnetic path cross-sectional area Af of the rotor 30 and the magnetic pole portion surface area As is specified to satisfy the following formula (14).

$$Af < As \text{ or } Af \leq As \tag{14}$$

Figure 5:
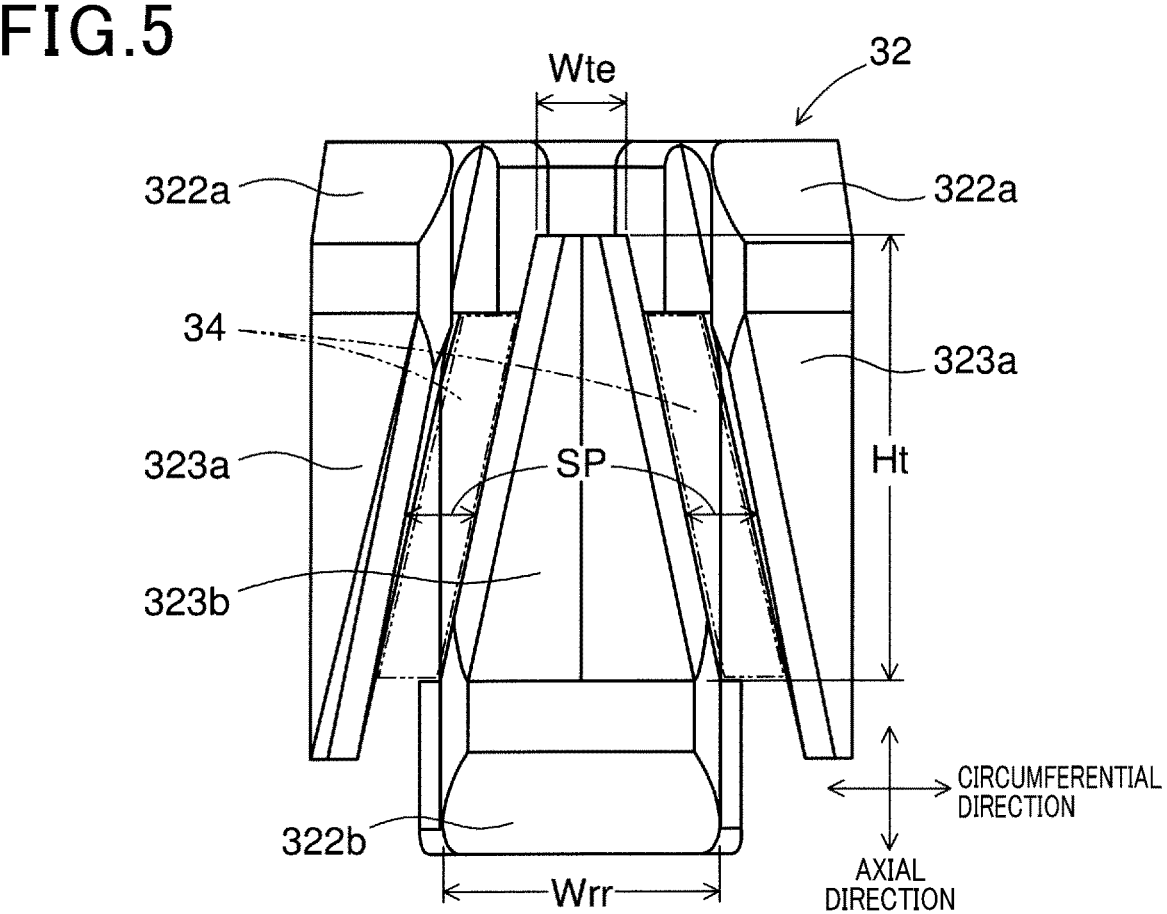
FIG. 5 is a schematic view illustrating dimensions of claw-shaped magnetic pole portions of the field core of the rotating electric machine according to the first embodiment.

Next, the magnetic pole portion surface area As is defined. As shown in FIG. 5, the circumferential width of each of the claw-shaped magnetic pole portions 323 at its proximal end (root) is designated by Wrr [mm]. The circumferential width of each of the claw-shaped magnetic pole portions 323 at its distal end is designated by Wte [mm]. The axial height of that part of each of the claw-shaped magnetic pole portions 323 which protrudes from the corresponding disc portion 322 is designated by Ht [mm]. In addition, it should be noted that the circumferential widths Wte and Wrr are measured as straight-line distances without considering curvatures.

Figure 6:
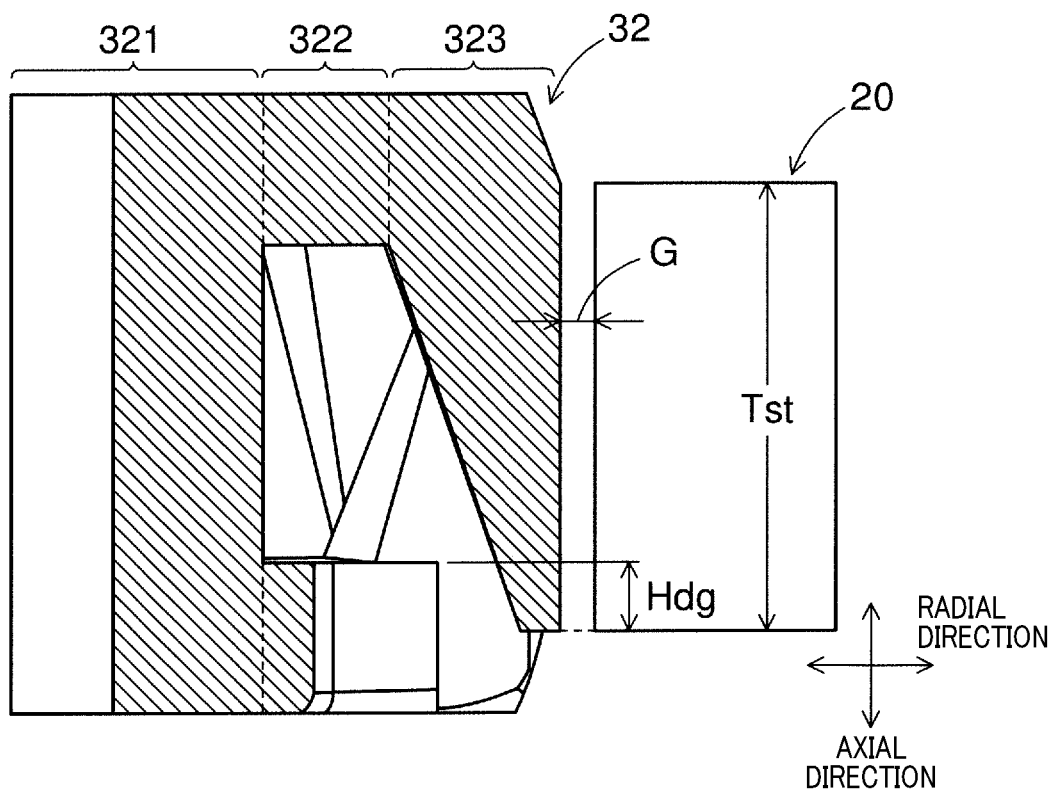
FIG. 6 is a schematic view illustrating a disc guide Hdg in the rotating electric machine according to the first embodiment.

As shown in FIG. 6, the axial range where each of the disc portions 322 radially overlaps the stator core 21 will be referred to as disc guide Hdg [mm]. Then, the magnetic pole portion surface area As can be expressed by the following formula (15). In addition, the relationship between the magnetic pole portion surface area As and the boss portion cross-sectional area Ab will be described in detail later.

$$As = (Wte + Wrr) \times Ht/2 + Hdg \times Wrr \tag{15}$$

In addition, there are cases where cuts, R portions or chamfered portions are provided in the disc portions 322, the claw-shaped magnetic pole portions 323 or the stator core 21 for the sake of magnet insertion or strength reinforcement. However, in these cases, no big difference occurs in the value of the magnetic pole portion surface area As determined by the above formula (15).

The field coil 33 is wound on the stator 20 side (i.e., radially outer side in the present embodiment) of the first boss portion 321a of the first pole core 32a and the second boss portion 321b of the second pole core 32b. The field coil 33 is surrounded by the first disc portion 322a and first claw-shaped magnetic pole portions 323a of the first pole core 32a and the second disc portion 322b and second claw-shaped magnetic pole portions 323b of the second pole core 32b.

Upon field current If flowing in the field coil 33, magnetomotive force is generated in the boss portion 321 of the field core 32. The field current If is supplied from a not-shown field current control circuit to the field coil 33 via a regulator 43, brushes 41 and slip rings 42, which are shown in FIG. 1. By the magnetomotive force generated in the boss portion 321, the first claw-shaped magnetic pole portions 323a of the first pole core 32a and the second claw-shaped magnetic pole portions 323b of the second pole core 32b are magnetized into different polarities. That is, the first claw-shaped magnetic pole portions 323a are magnetized into one of N and S polarities while the second claw-shaped magnetic pole portions 323b are magnetized into the other of N and S polarities.

Figure 7:
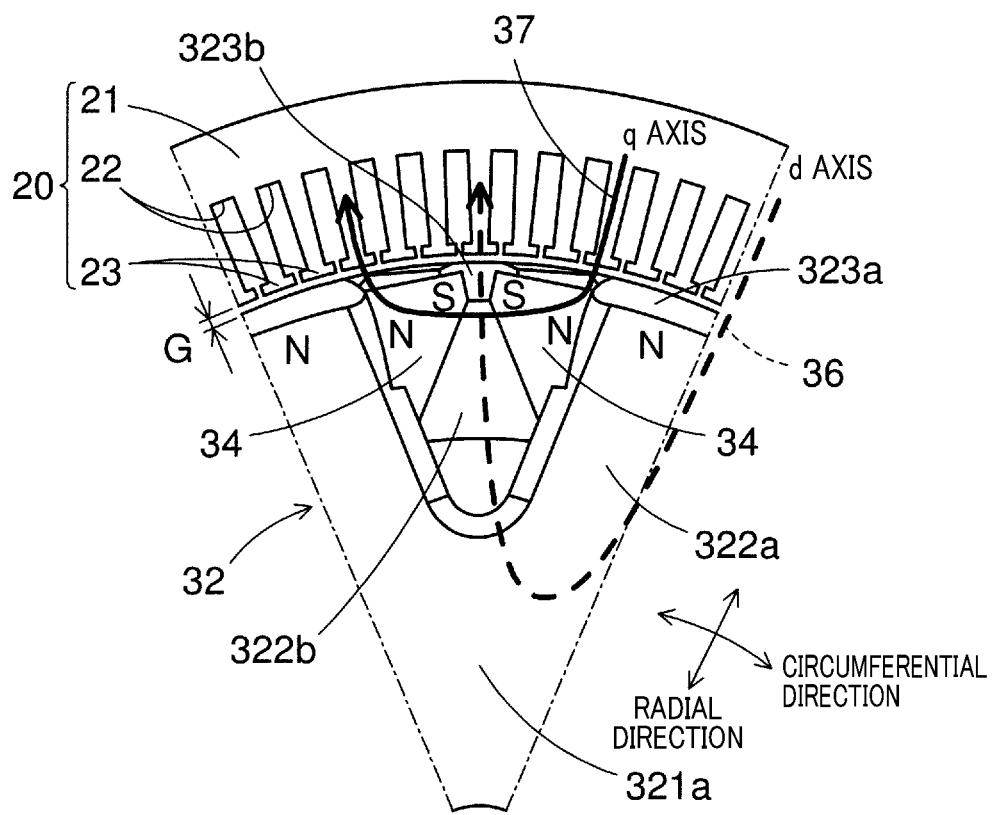
FIG. 7 is a schematic view illustrating both a d-axis magnetic circuit and a q-axis magnetic circuit formed in the rotating electric machine according to the first embodiment.
Figure 8:
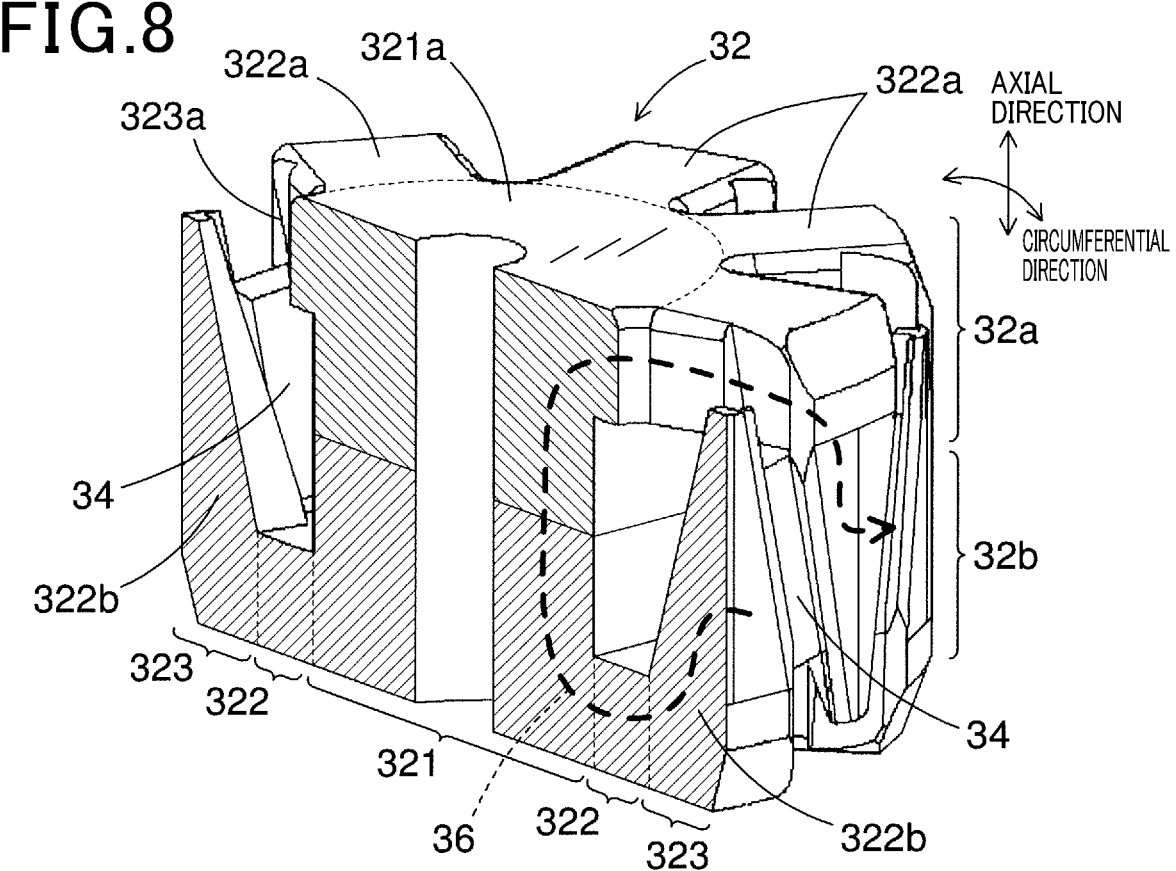
FIG. 8 is a schematic view illustrating flow of magnetic flux along the d-axis magnetic circuit in the field core of the rotating electric machine according to the first embodiment.

When the field current If flows in the field coil 33, as shown in FIGS. 7 and 8, a d-axis magnetic circuit 36 is formed which causes counterelectromotive force of the rotor 30. The d-axis magnetic circuit 36, which is shown with a bold dashed line in FIG. 7, is formed by magnetic flux that flows through the boss portion 321 and one pair of the first and second claw-shaped magnetic pole portions 323a and 323b of the field core 32.

An example of flow of the above-described magnetic flux is shown with a bold dashed line in FIG. 8. In this example, upon electric current flowing in the field coil 33, the first pole core 32a is magnetized into N poles whereas the second pole core 32b is magnetized into S poles. First, the magnetic flux flows, from a first tooth 23 of the stator core 21 through which the d axis extends, into the second claw-shaped magnetic pole portion 323b of the field core 32. Then, the magnetic flux flows, via the second disc portion 322b, the second boss portion 321b, the first boss portion 321a, the first disc portion 322a and the first claw-shaped magnetic pole portion 323a, to a second tooth 23 of the stator core 21 which is located apart from the first tooth 23 by one magnetic pole. Thereafter, the magnetic flux returns to the first tooth 23 via a back yoke 24 of the stator core 21. In addition, though not shown in the figures, in the case where the first pole core 32a is magnetized into S poles whereas the second pole core 32b is magnetized into N poles, the magnetic flux flows in the reverse order to the above.

Moreover, upon electric current being caused by magnetic flux, which flows along the d-axis magnetic circuit 36 and the first magnet magnetic circuit 38 (to be described later) to cross the stator 20, to flow in the armature coil 25, a q-axis magnetic circuit 37 is formed which is shown with a bold solid line in FIG. 7. The q-axis magnetic circuit 37 is formed by magnetic flux flowing through the q axis of the stator core 21; the q axis is located at a position offset from the d axis by 90° in electrical angle. In the present embodiment, the permeance Prt of the d-axis magnetic circuit 36 and the permeance Pst of the q-axis magnetic circuit 37 are set to satisfy the relationship of the following formula (16) when the rotor 30 is under load.

$$Prt < Pst \quad (16)$$

Here, the expression "when the rotor 30 is under load" denotes a state of the rotor 30 where the field current If, which is supplied as rated current to the field coil 33, is in the range of 4-20 [A]; this range is a general range in consideration of the capability of vehicular brushes (corresponding to the brushes 41 according to the present embodiment). In addition, the field current If might be set to a value (e.g., 30 [A] or 50 [A]) that is higher than 20 [A] with future technological progress in vehicular brushes. Otherwise, with a brushless configuration having no limitation on the field current If, it is possible to set the field current If to be even higher. In any cases, it is required to satisfy the relationship of the above formula (16). Moreover, in terms of satisfying the above formula (16) with the present brushes 41, the effects of satisfying the above formulas (8) and (11) are significant.

Moreover, it is preferable for the permeance Prt of the d-axis magnetic circuit 36 and the permeance Pst of the q-axis magnetic circuit 37 to be set to satisfy the following formula (17), where n is a real number greater than or equal to 1. In addition, methods of measuring the permeance Prt and the permeance Pst will be described later.

$$Pst:Prt = 2n:1 \quad (17)$$

Next, the inductance ratio (i.e., Lq/Ld) between the q-axis inductance Lq and the d-axis inductance Ld is defined as salient pole ratio ρ. The salient pole ratio ρ is ρ≈1 in Lundell rotors according to the prior art, and ρ≈2–4 in IPM rotors according to the prior art. In the present embodiment, with the permeance ratio between the d-axis magnetic circuit 36 and the q-axis magnetic circuit 37 set to satisfy the above formula (17), it becomes possible to make the mode of the rotor 30, which is a Lundell rotor, under load approach the mode of an IPM rotor; thus it becomes possible to make the salient pole ratio ρ higher than or equal to 2.

As shown in FIG. 5, between the circumferentially-adjacent first and second claw-shaped magnetic pole portions 323a and 323b, there are formed gaps SP. Each of the gaps SP extends obliquely with respect to the axial direction. In each of the gaps SP, there is arranged one of the permanent magnets 34 that are shown with two-dot chain lines in FIG. 5. For sufficiently supplying a demagnetizing magnetic field to the field core 32, it is preferable to employ, as the permanent magnets 34, those whose residual magnetic flux density Br is higher than or equal to 1 [T].

Each of the permanent magnets 34 is formed in a substantially cuboid shape and arranged to have its axis of easy magnetization oriented in the circumferential direction. Each of the permanent magnets 34 is held to have its magnetic pole portions respectively on the two circumferential sides abutting circumferential side surfaces of one pair of the first and second claw-shaped magnetic pole portions 323a and 323b. In each of the permanent magnets 34, the magnetic pole portions are formed so as to match the polarities induced in the pair of the first and second claw-shaped magnetic pole portions 323a and 323b by the magnetomotive force generated in the field core 32. For example, as shown in FIG. 7, when the first claw-shaped magnetic pole portion 323a is magnetized into an N pole and the second claw-shaped magnetic pole portion 323b is magnetized into an S pole, each of the permanent magnets 34 is arranged to have its magnetic pole portion on the first claw-shaped magnetic pole portion 323a side form an N pole and its magnetic pole portion on the second claw-shaped magnetic pole portion 323b side form an S pole.

With the magnet magnetic flux generated by the permanent magnets 34 arranged as described above, as shown in FIG. 9, both the aforementioned first magnet magnetic circuit 38 and a second magnet magnetic circuit 39 are formed for each of the permanent magnets 34. The first magnet magnetic circuit 38 shown with a one-dot chain line in FIG. 9 corresponds to the magnetic circuit MC1 shown in FIG. 19. Via the first magnet magnetic circuit 38, the magnet magnetic flux flows to cross the stator 20. As above, since the magnet magnetic flux flowing along the first magnet magnetic circuit 38 crosses the stator 20, it contributes to improvement of the counterelectromotive force and improvement of the torque.

Figure 9:
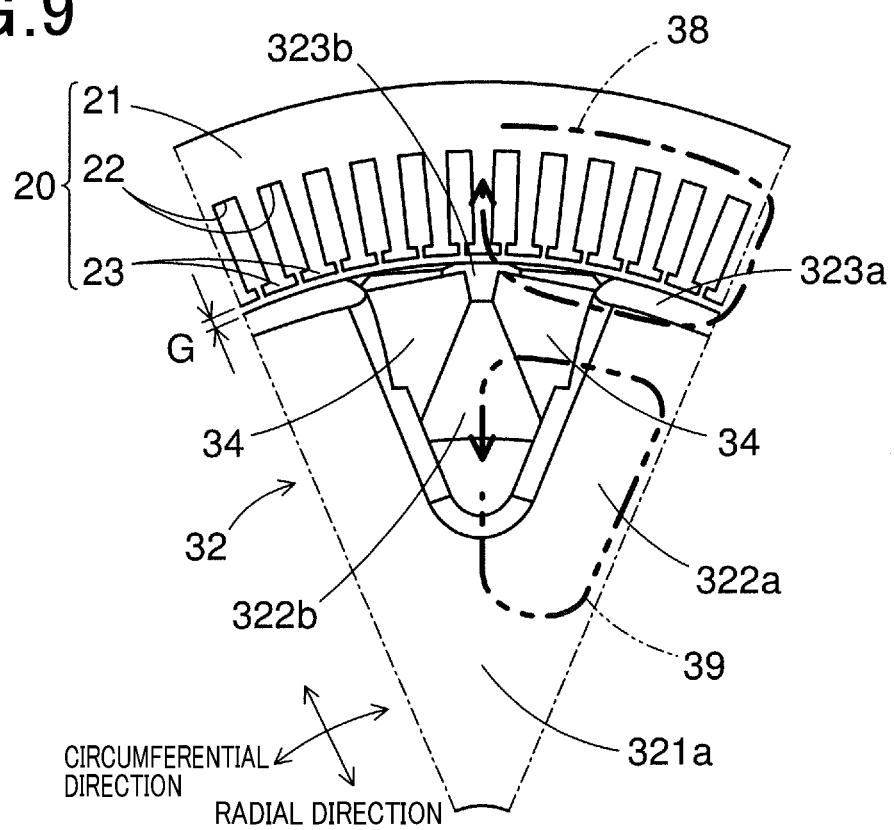
FIG. 9 is a schematic view illustrating two magnetic circuits formed by each permanent magnet in the rotating electric machine according to the first embodiment.

On the other hand, the second magnet magnetic circuit 39 shown with a two-dot chain line in FIG. 9 corresponds to the magnetic circuit MC2 shown in FIG. 19. Via the second magnet magnetic circuit 39, the magnet magnetic flux flows through the boss portion 321 and the disc portions 322 to circulate within the rotor 30. The magnet magnetic flux flowing along the second magnet magnetic circuit 39 does not cross the stator 20, thus contributing to neither improvement of the counterelectromotive force nor improvement of the torque.

The d-axis magnetic circuit 36 shown in FIG. 7 and the first magnet magnetic circuit 38 shown in FIG. 9 share a magnetic path from the second claw-shaped magnetic pole portion 323b to the first claw-shaped magnetic pole portion 323a via the stator 20. Moreover, the d-axis magnetic circuit 36 shown in FIG. 7 and the second magnet magnetic circuit 39 shown in FIG. 9 share a magnetic path formed in the first and second boss portions 321a and 321b and the first and second disc portions 322a and 322b of the rotor 30.

Here, let Ab [mm²] be the magnetic path cross-sectional area of the boss portion 321 per pole pair, let B50 [T] be the magnetic flux density when a magnetic field of 5000 [A/m] is applied to the boss portion 321, and let Br [T] be the residual magnetic flux density of the permanent magnets 34 arranged between the circumferentially-adjacent claw-shaped magnetic pole portions 323. Moreover, as shown with cross-hatch lines in FIG. 3, let Am [mm²] be the magnetic path cross-sectional area of each of the magnetic pole portions (i.e., the area of each of the surfaces constituting the magnetic poles) of the permanent magnets 34. The boss portion 321 and the permanent magnets 34 are provided to satisfy the following formula (18). The setting of this relationship will be described in detail later.

$$2 \times Br \times Am < B50 \times Ab \qquad (18)$$

The field coil energization device 40 shown in FIG. 1 is a device for energizing the field coil 33. In the present embodiment, the field coil energization device 40 includes the pair of brushes 41, the pair of slip rings 42, the regulator 43 and the rectifier 44. The slip rings 42 are fitted and fixed on one axial end portion (i.e., right end portion in FIG. 1) of the rotating shaft 31. Each of the brushes 41 is slidably arranged with its radially inner end part pressed on the surface of a corresponding one of the slip rings 42. The field current (direct current) If is supplied to the field coil 33 via the brushes 41 and the slip rings 42. The regulator 43 regulates an output voltage of the automotive alternator 1 by controlling the field current If supplied to the field coil 33. The rectifier 44 is connected with the armature coil 25. The rectifier 44 rectifies alternating current outputted from the armature coil 25 into direct current. The rectifier 44 is configured with one or more rectifying elements. Each rectifying element may be implemented by, for example, a diode, a thyristor, or a MOSFET.

In the automotive alternator 1 configured as described above, upon transmission of mechanical power (or torque) from the engine of the vehicle to the pulley 35 via a belt, the rotor 30 rotates in a predetermined direction. During rotation of the rotor 30, the field current If is supplied to the field coil 33 via the brushes 41 and the slip rings 42, exciting the first pole core 32a and the second pole core 32b. By this excitation, the first claw-shaped magnetic pole portions 323a and the second claw-shaped magnetic pole portions 323b are magnetized into different polarities, forming N poles and S poles alternately in the direction of rotation of the rotor 30 (or circumferential direction).

The magnet magnetic flux generated by each of the permanent magnets 34 flows to the stator 20 (more specifically, the teeth 23 of the stator core 21) via the first claw-shaped magnetic pole portions 323a and the second claw-shaped magnetic pole portions 323b, crossing the armature coil 25. Consequently, a rotating magnetic field is applied to the armature coil 25, causing AC electromotive force to be generated in the armature coil 25. The AC electromotive force generated in the armature coil 25 is rectified by the rectifier 44 into a DC voltage; then the DC voltage is outputted from an output terminal to a battery (not shown). The battery corresponds to an electric power supply that supplies electric power to the field coil energization device 40. The battery is a secondary battery that can be charged and discharged.

(Regarding Setting of Relationship of Formula (18))

The automotive alternator 1 is a motor-generator which is replaceable with an alternator and a starter. The automotive alternator 1 is connected to an electric power supply whose rated voltage is in the range of 12-48 [V]. The tolerance of the rated voltage is in the range of 6-60 [V]. Therefore, it is not allowed to output a counterelectromotive force as high as in IPM rotors. Generally, a counterelectromotive force of 200-300 [V] is generated in IPM rotors where the rotor outer diameter is about 70-120 [mm] and the rotor axial length is about 30-80 [mm]. However, with such a counterelectromotive force, a battery of 12-48 [V] will be overcharged. If a charge control is performed for prevention of overcharge, there is concern about the influence on other electrical parts due to a high voltage; therefore, it is impossible to sufficiently lower the counterelectromotive force.

To solve the above problem, the rotor 30 is designed to satisfy the relationship of the formula (18). Otherwise, it may be impossible to sufficiently lower magnetic flux which is the main cause of the counterelectromotive force. The saturation magnetic flux density Bs is the saturation magnetic flux density of the field core 32. Here, unless the relative permeability is sufficiently high, it is impossible to sufficiently absorb the residual magnetic flux density Br. In addition, though the saturation magnetic flux density Bs of the field core 32 is employed, investigation is made herein with the value of the magnetic flux density B50 that is commonly used.

In general, in the case of the rated voltage of the electric power supply being 12-48 [V], the magnetomotive force applied to the field core 32 is lower than or equal to 2500 [AT]. Therefore, the thickness [mm] and magnetic coercive force Hc [A/m] of the permanent magnets 34 are designed with a safety factor so as to be 5000 [AT] or higher. The residual magnetic flux density Br [T] and the magnetic coercive force Hc slightly vary depending on the designer; however, it is necessary for them to be designed to be about 5000 [AT] in a temperature range of −40° C. to +160° C. within which the rotor 30 is expected to be used. In the design example of the present embodiment, the permanent magnets 34 are designed at about 5000 [AT] and the boss portion 321 is specified with the value of the magnetic flux density B50 which is the magnetic flux density at 5000 [AT]; therefore, it is possible to satisfy the relationship of 2×Br [T]×Am [mm²]<Bs [T]×Ab [mm²]. Moreover, the relative permeability of the boss portion 321 when the field current is weakened is higher than or equal to 30, and thus sufficiently high.

The gaps SP, which are provided for inserting and arranging the permanent magnets 34 in the field core 32, include a play of about 1 [mm]. With the play of such a degree, the permanent magnets 34 having the residual magnetic flux density Br can be arranged in the magnetic circuit at a sufficiently high permeance. Therefore, the effective magnetic flux density Bd and the residual magnetic flux density Br can be considered to be equal (i.e., Bd=Br).

Figure 10:
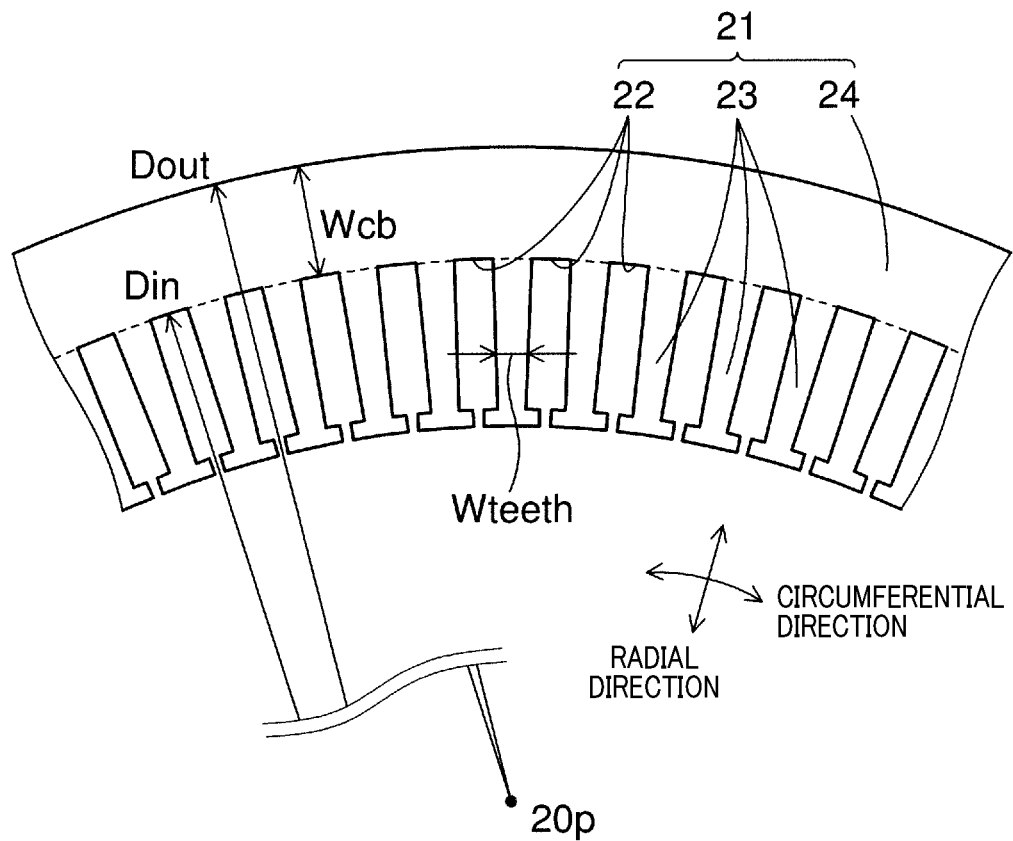
FIG. 10 is a schematic view illustrating dimensions relating to the cross-sectional area and outer diameter ratio of a stator of the rotating electric machine according to the first embodiment.

FIG. 10 illustrates dimensions relating to the stator core 21 of the stator 20. With reference to a center point 20p of the stator 20, the outer diameter of the back yoke 24 is designated by Dout [mm] and the inner diameter of the back yoke 24 is designated by Din [mm]. The stator core 21 is designed to satisfy the following formula (19).

$$0.905 < Din/Dout < 0.938 \qquad (19)$$

Figure 11:
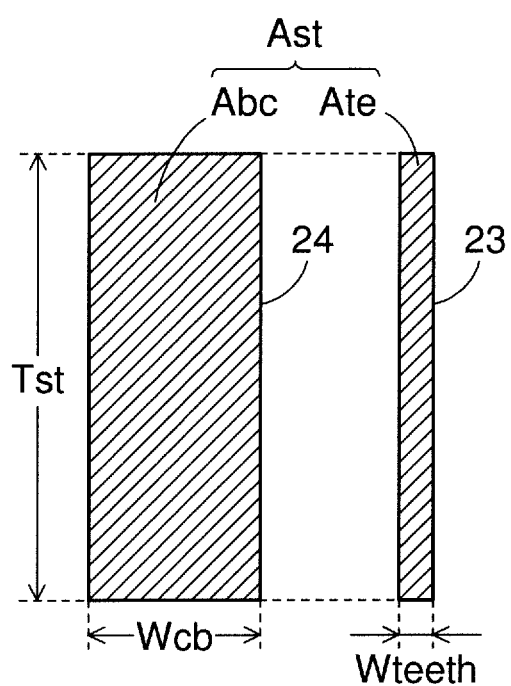
FIG. 11 is a schematic view illustrating the magnetic path cross-sectional area of the stator of the rotating electric machine according to the first embodiment.

In FIG. 11, the radial width of the back yoke 24 is designated by Wcb [mm] (hereinafter, to be referred to as "back yoke width Wcb"). In the case where the back yoke width Wcb varies, the narrowest width is employed. Moreover, the circumferential width of the teeth 23 is designated by Wteeth [mm] (hereinafter, to be referred to as "teeth width Wteeth"). In the case where the teeth width Wteeth varies as shown in FIG. 10, the narrowest width is employed.

As shown in FIGS. 1, 4 and 6, let Tst [mm] be the axial length of the stator 20. Then, the back yoke cross-sectional area Abc [mm²], which is the cross-sectional area of the back yoke 24, can be expressed by the following formula (20). Assuming the three phases of the armature coil 25 to be arranged at equal intervals of 120° in electrical angle and letting S b the slot multiplier number, the teeth cross-sectional area Ate [mm²], which is the cross-sectional area of the teeth 23, can be expressed by the following formula (21). In the present embodiment, the armature coil 25 is constituted of two three-phase coils; therefore S=2.

$$Abc = Tst \times Wcb \quad (20)$$

$$Ate = Tst \times Wteeth \times 1.5 \times S \quad (21)$$

The magnetic path cross-sectional area of the stator 20 is designated by Ast [mm²] (hereinafter, to be referred to as "magnetic path cross-sectional area Ast"). As the magnetic path cross-sectional area Ast, a minimum one of the cross-sectional areas of magnetic paths formed in the stator 20 is employed. For example, of the back yoke cross-sectional area Abc and the teeth cross-sectional area Ate show in FIG. 11, the smaller cross-sectional area is employed. It should be noted that the teeth cross-sectional area Ate shown in FIG. 11 corresponds to one phase. The magnetic path cross-sectional area Ast of the stator 20 and the magnetic path cross-sectional area Af of the rotor 30 are set to satisfy the relationships of the following formulas (22) and (23).

$$1.0 < Ast/Af < 1.6 \quad (22)$$

$$Ast > Af \quad (23)$$

In addition, in the case of the number of phases of the armature coil 25 being different from three, it may be considered that Abc=Ast.

The d-axis magnetic circuit 36 shown in FIG. 7 includes, as its magnetic paths, not only the stator 20, but also the field core 32 (i.e., the boss portion 321, the disc portions 322 and the claw-shaped magnetic pole portions 323) of the rotor 30 as shown in FIG. 8. In contrast, the q-axis magnetic circuit 37 shown in FIG. 7 includes the stator 20 as its main magnetic path. Of the rotor 30, only the permanent magnets 34 and the claw-shaped magnetic pole portions 323 are included in the q-axis magnetic circuit 37 as its magnetic paths. Accordingly, satisfying the above formula (23), the above formula (16) relating to permeance is also satisfied in view of the above formula (10) relating to magnetic reluctance.

(Permeance Measurement Method)

Figure 12:
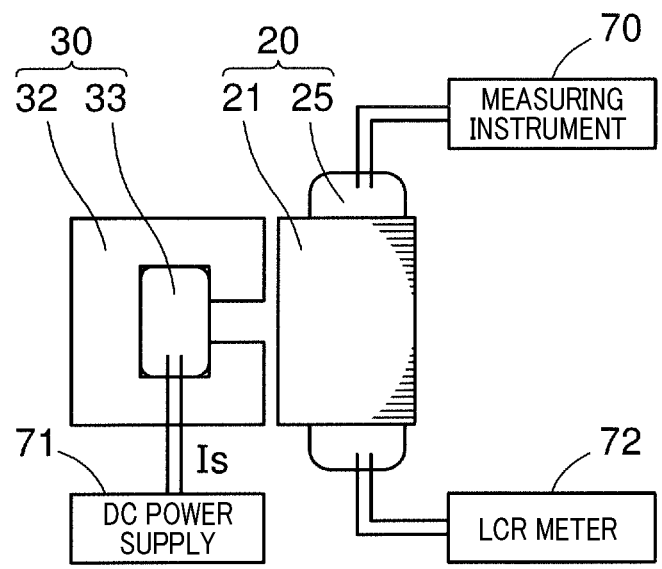
FIG. 12 is a schematic view illustrating a permeance measurement method.

Next, a method of measuring the permeance Prt of the d-axis magnetic circuit 36 and the permeance Pst of the q-axis magnetic circuit 37 will be described. As shown in FIG. 12, the measurement is performed with a DC power supply 71 connected to the field coil 33 and an LCR meter 72 and a measuring instrument 70 connected to the armature coil 25. The measuring instrument 70 may be a voltage measuring device that measures a voltage via a voltage probe. For example, the measuring instrument 70 may be any combination of devices such as an oscilloscope, a voltage meter and a computer.

When performing the measurement, it is preferable for the positional relationship between the stator 20 and the rotor 30 to be such that the stator 20 performs no field-weakening excitation with respect to a d-axis center of the rotor 30, but excitation toward the q axis. This is because during a field-weakening excitation, field weakening is applied to the field circuit of the rotor 30 and thus it may become impossible to perform accurate measurement. Of course, in a range about within 15° in electrical angle where the field-weakening effect is low, the field-weakening effect is sin 15°≈0.25 of the excitation magnetic flux. However, if the positional relationship is such that a maximum inductance is obtainable within a range of ±15° in electrical angle with reference to the q-axis direction, data measured with the positional relationship is reasonably reliable. Moreover, since the magnet magnetic flux is not taken into account, it is preferable to perform the measurement with the permanent magnets 34 removed or sufficiently demagnetized.

Figure 13:
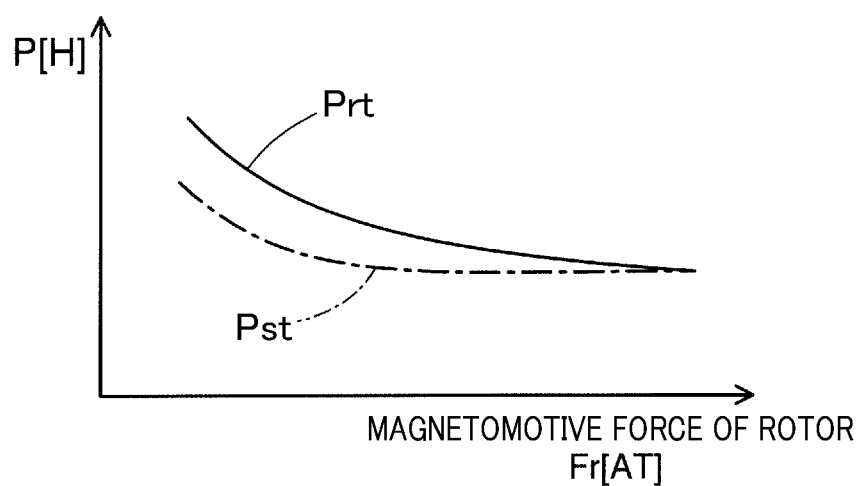
FIG. 13 is a graphical representation showing the results of measuring permeances of a rotating electric machine according to the prior art.
Figure 14:
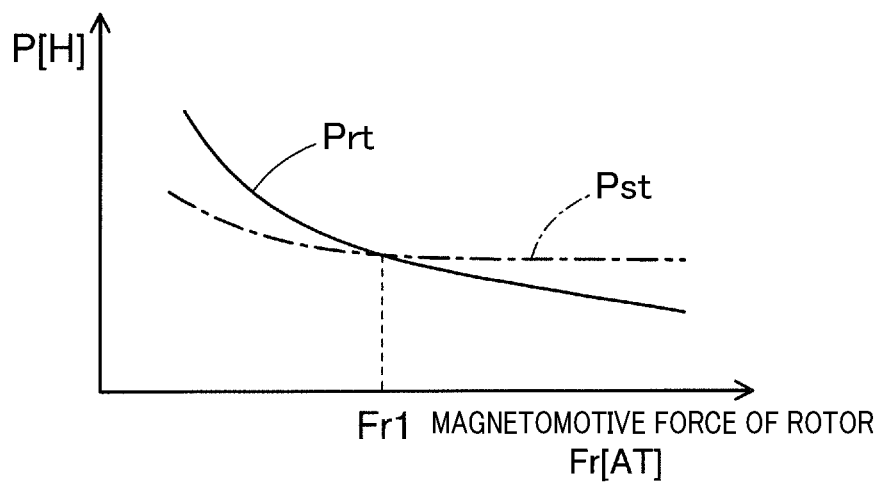
FIG. 14 is a graphical representation showing the results of measuring permeances of the rotating electric machine according to the first embodiment.

Changes in the permeances P measured as described above are shown in FIGS. 13 and 14. Specifically, FIG. 13 shows changes in the permeances P of a rotating electric machine according to the prior art. It should be noted that this rotating electric machine according to the prior art is a rotating electric machine which is specified by the formula described in Patent Document 1. In contrast, FIG. 14 shows changes in the permeances P of the automotive alternator 1 according to the present embodiment. In addition, in these figures, change in the permeance Prt of the rotor is shown with a solid line while change in the permeance Pst of the stator is shown with a one-dot chain line. The horizontal axis represents the magnetomotive force Fr of the rotor 30, which relates to the magnitude of the field current If supplied to the field coil 33.

In FIG. 13, in a no-load state where the magnetomotive force Fr is low, the permeance Prt is higher than the permeance Pst. As the magnetomotive force Fr increases with increase in the field current supplied to the field coil, the difference between the permeance Prt and the permeance Pst decreases and finally the permeance Prt becomes equal to the permeance Pst. This is because in the no-load state, due to magnetic barriers and magnets present on the q axis, the permeance of the stator is lower than the permeance of the rotor 30. That is, it is difficult for magnetic flux to flow through the stator 20, and no-load counterelectromotive force is generated to prevent overcharge.

In FIG. 14, in the no-load state where the magnetomotive force Fr is low, the permeance Prt is higher than the permeance Pst as in FIG. 13. However, with increase in the field current If supplied to the field coil 33, the permeance Prt drops more sharply than the permeance Pst. Consequently, when the magnetomotive force Fr becomes equal to the magnetomotive force Frl, the permeance Prt becomes equal to the permeance Pst. Moreover, in a region where the magnetomotive force Fr is higher than the magnetomotive force Frl, the permeance Prt is lower than the permeance Pst. This is because it becomes easy for magnetic flux to flow through the stator 20, and the counterelectromotive force under load is increased to result in high torque.

Here, let $\phi m$ [Wb] be the magnet magnetic flux of the permanent magnets 34 and $\phi f$ [Wb] be the field magnetic flux generated by supply of the field current If to the field coil 33. Then, the main magnetic flux 'Ψ' [Wb] can be expressed by the following formula (24).

$$\Psi = \phi m + \phi f \quad (24)$$

In view of the above formula (24), the magnet torque Tm [Nm] can be expressed by the following formula (25), where 'Ψ' [Wb] is the main magnetic flux and Iq [A] is the q-axis current.

$$Tm = \Psi \times Iq = (\phi m + \phi f) \times Iq \quad (25)$$

Figure 15:
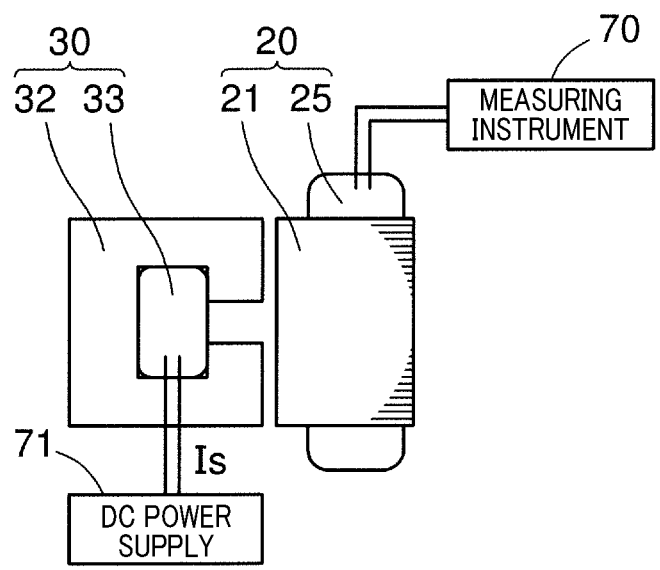
FIG. 15 is a schematic view illustrating a method of measuring the permeance of the d-axis magnetic circuit in the rotating electric machine according to the first embodiment.

Next, referring to FIG. 15, a method of calculating the permeance Prt of the d-axis magnetic circuit 36 will be described. The field coil 33 is energized by electric current supplied from the DC power supply 71 (i.e., input current Is to be described later), causing the field circuit (i.e., the d-axis magnetic circuit 36 shown with a dashed line in FIGS. 7 and 8) to be excited. With the field circuit being excited, the rotor 30 is rotated, causing the counterelectromotive force Ve to be generated in the field coil 33. The rotor 30 is operated at each arbitrary and constant rotational speed, and the then counterelectromotive force is measured by the measuring instrument 70. The counterelectromotive force Ve increases with increase in the rotational speed of the rotor 30.

Figure 16:
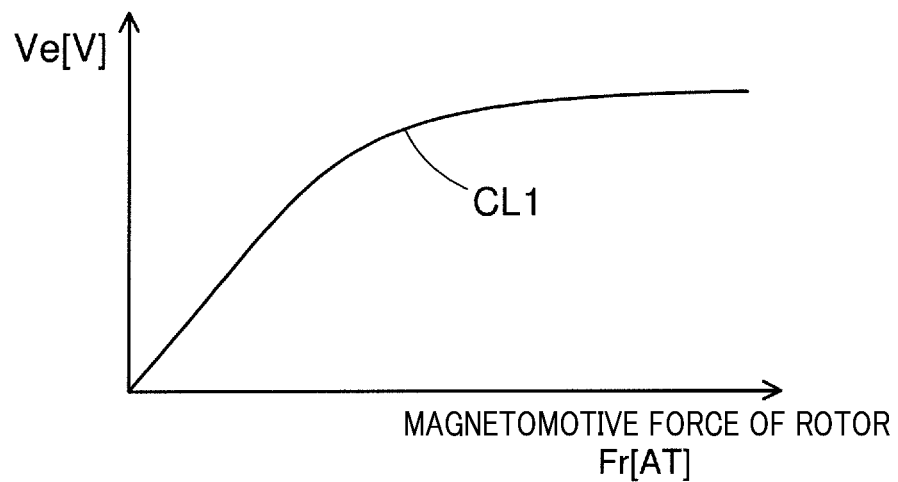
FIG. 16 is a graphical representation illustrating the relationship between the magnetomotive force of a rotor and the counterelectromotive force of a field coil in the rotating electric machine according to the first embodiment.

FIG. 16 shows the relationship between the magnetomotive force Fr of the rotor 30 and the counterelectromotive force Ve of the field coil 33. As shown with a solid characteristic line CL1 in FIG. 16, there is a saturation tendency in the change of slope of the counterelectromotive force Ve of the rotor 30, conforming to saturation of the field circuit.

In the no-load mode where no load is applied to the rotor 30, the magnetic flux change between 0 [AT] and x [AT] is determined, where 0 [AT] is the start value of the magnetomotive force Fr of the rotor 30 and x [AT] is the end value of the magnetomotive force Fr of the rotor 30 which is a positive real value. In the non-excitation state, the inductance is measured as L0 [H], the counterelectromotive force generated in the field coil 33 is measured as V0 [V] and the excitation current flowing in the field coil 33 is measured as I0 [A]. In the excitation state of x [AT], the counterelectromotive force generated in the field coil 33 is measured as Vx [V] and the excitation current flowing in the field coil 33 is measured as Ix [A]. The inductance L0 subject to these conditions can be determined by the following formula (26).

$$L0=(Vx-V0)/(Ix-I0) \quad (26)$$

In the under-load mode where load is applied to the rotor 30, the measurement is performed with the field circuit being in an excited state. For example, with the inductance being L100 [H], the magnetic flux change between 100 [AT] and 200 [AT] is determined, where 100 [AT] is the start value of the magnetomotive force Fr of the rotor 30 and 200 [AT] is the end value of the magnetomotive force Fr of the rotor 30. In the excitation state of 100 [AT], the counterelectromotive force generated in the field coil 33 is measured as V100 [V] and the excitation current flowing in the field coil 33 is measured as I100 [A]. In the excitation state of 200 [AT], the counterelectromotive force generated in the field coil 33 is measured as V200 [V] and the excitation current flowing in the field coil 33 is measured as I200 [A]. The inductance L100 subject to these conditions can be determined by the following formula (27).

$$L100=(V200-V100)/(I200-I100) \quad (27)$$

The excitation current Ifs can be expressed by the following formula (28), where Is is the input current inputted from the DC power supply 71 to the field coil 33 and Nr is the number of turns of the field coil 33 wound on the boss portion 321. The excitation current Ifs is similarly applied to the excitation currents I0, Ix, I100 and I200.

$$Ifs=Is \times Nr^2 \quad (28)$$

In view of the formula (28), each of the formulas (26) and (27) has its denominator multiplied by the square of the number of turns Nr. Therefore, the permeance Prt of the d-axis magnetic circuit 36 is equal to the inductance L0, L100 per turn. That is, each of the formulas (26) and (27) coincides with the general formula (8).

Figure 17:
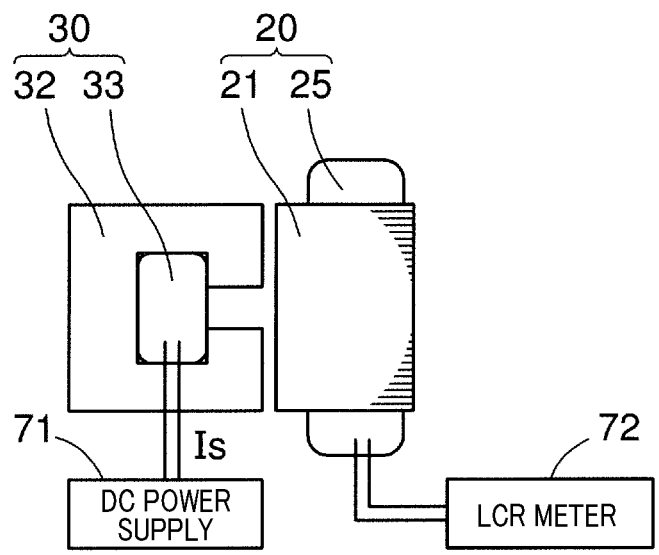
FIG. 17 is a schematic view illustrating a method of measuring the permeance of the q-axis magnetic circuit in the rotating electric machine according to the first embodiment.

Next, referring to FIG. 17, a method of calculating the permeance Pst of the q-axis magnetic circuit 37 will be described. The field coil 33 is energized by electric current inputted from the DC power supply 71 (i.e., the input current Is described above), causing the field circuit (i.e., the d-axis magnetic circuit 36 shown with a dashed line in FIGS. 7 and 8) to be excited. With the field circuit being excited and the stator 20 and the rotor 30 satisfying the above-described positional relationship, the armature coil 25 of the stator 20 is energized, causing magnetic flux change to occur. The inductance Ls of the stator 20 is measured, using the LCR meter 72, by increasing the excitation current supplied to the field coil 33 with the rotating shaft 31 of the rotor 30 locked.

Figure 18:
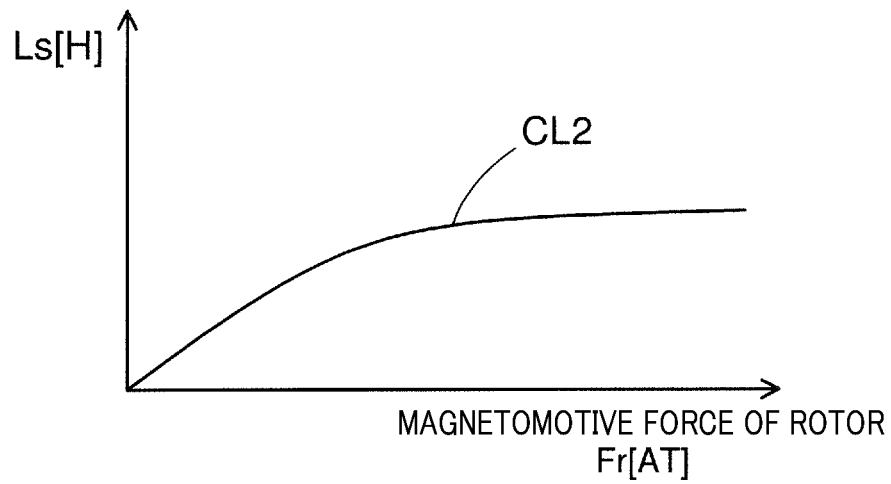
FIG. 18 is a graphical representation illustrating the relationship between the magnetomotive force of the rotor and the inductance of the stator in the rotating electric machine according to the first embodiment.

FIG. 18 shows the relationship between the magnetomotive force Fr of the rotor 30 and the inductance Ls of the stator 20. As shown with a solid characteristic line CL2 in FIG. 18, there is a saturation tendency in the change of slope of the inductance Ls, conforming to saturation of the field circuit.

The number of turns Ns of the armature coil 25 of the stator 20 has been known in advance. Therefore, upon measuring the inductance Ls using the LCR meter 72, the permeance Pst of the q-axis magnetic circuit 37 can be determined by the following formula (29). This formula (29) coincides with the general formula (8).

$$Pst=Ls/Ns^2 \quad (29)$$

(Regarding Relationship Between Magnetic Pole Portion Surface Area as and Boss Portion Cross-Sectional Area Ab)

Here, the range within which the magnet magnetic flux generated by the permanent magnets 34 can be effectively used is investigated. In specifying the correlation formula in the above-described Patent Document 1, the conditions are incomplete; therefore, the correlation formula may not be satisfied when, for example, the size of the boss portion 321 of the field core 32 is changed. Accordingly, the following investigation is made for the rotor 30 as a whole.

In the automotive alternator 1 which is a claw pole rotating electric machine, magnetic flux is generated at a location (more specifically, the boss portion 321) different from those at which the stator 20 and the rotor 30 face each other; the axial length Tst of the stator 20 can be fully utilized by having the magnetic flux flow in the axial direction. Moreover, in the automotive alternator 1, as shown in FIG. 4, the magnetic flux is outputted with the boss portion cross-sectional are Ab, the cross-sectional area Ad of the disc portions 322 and the root cross-sectional area At of the claw-shaped magnetic pole portions 323 kept substantially constant. In addition, in the case where stepped portions are formed from the boss portion 321 to each of the disc portions 322 and thus the cross-sectional area is partially reduced, the reduced cross-sectional area will be employed as the boss portion cross-sectional area Ab or the disc portion cross-sectional area Ad. By forming the stepped portions, it is possible to change the allowable amount of magnetic flux. Moreover, each of the claw-shaped magnetic pole portions 323 has a suitable area of the facing surface, which faces the stator 20, for allowing the field magnetic flux to flow therethrough; the field magnetic flux is generated in the boss portion 321 upon energization of the field coil 33 (not shown in FIG. 4) wound on the radially outer side of the boss portion 321. That is, each of the claw-shaped magnetic pole portions 323 has a suitable area of the facing surface in proportion to the boss portion cross-sectional area Ab.

As shown in FIG. 4, in the case of each of the disc portions 322 partially overlapping the stator 20 in the radial direction, it is possible to reduce the claw-shaped magnetic pole portion surface area As to be smaller than the boss portion cross-sectional area Ab by an amount corresponding to the surface area of the overlapping portion. That is, ideal values can be calculated to satisfy the following formula (30) or formula (31). Here, in the rotor 30 which has the permanent magnets 34 mounted therein, there should be another solution since the number of magnetic force sources is increased.

$$Ab \approx Ad \approx As \quad (30)$$

$$As \approx Ab - (Tst - Tb)/2 \times W \quad (31)$$

In the rotor 30 which has the permanent magnets 34 and the field circuit provided therein, the magnet magnetic flux is distributed to two directions, i.e., the route (i.e., the second magnet magnetic circuit 39 shown in FIG. 9) along which the magnet magnetic flux flows in the rotor 30 against the field magnetic flux (i.e., the magnetic flux flowing along the d-axis magnetic circuit 36) and the route (i.e., the first magnet magnetic circuit 38 shown in FIG. 9) along which the magnet magnetic flux flows through the stator 20. Therefore, it should be possible to reduce the boss portion cross-sectional area Ab, the cross-sectional area Ad of the disc portions 322 and the root cross-sectional area At of the claw-shaped magnetic pole portions 323, all of which are shown in FIG. 4, to be smaller than those according to the prior art. Meanwhile, considering the counterelectromotive force Ve of the field coil 33, it is necessary to satisfy the relationship of the following formula (32). In addition, since the boss portion outer diameter Db shown in FIG. 3 is reduced, the arrangement space of the field coil 33 should be increased and thus the amount of the generated heat should be reduced.

$$Ab \times B50 \geq 2 \times Am \times Br \quad (32)$$

Upon the rotor outer diameter Dr shown in FIG. 3 being determined, the ratio between the rotor outer diameter Dr and the boss portion outer diameter Db should be uniquely determined since the ratio between the width W of the claw-shaped magnetic pole portions 323 and the width of the boss portion 321 per pole hardly changes even with change in the number of pole pairs Np. The boss portion outer diameter Db can be calculated based on the flowing-back magnet magnetic flux and the field magnetic flux. It goes without saying that to suppress the heat generation, the resistance of the field coil 33 is set to be in the range of 0.1-1.0 [Ω] for electric motors and in the range of 1.0-3.0 [Ω] for electric generators taking into account the present air-cooling capability. The ideal value of the boss portion cross-sectional area Ab, which is represented by Abopt [mm²], can be determined by the following formula (33).

$$Abopt = Ab \times B50 - 2 \times Am \times Bd \times (Prt/(Pst + Prt)) \quad (33)$$

At the time point of the present technology, the magnetic pole portion surface area As is set to such a value as to allow the field magnetic flux to sufficiently flow. According to the prior art, the main function of permanent magnets is to suppress leakage magnetic flux between the claw-shaped magnetic pole portions. Therefore, the magnetic pole portion surface area As in marketed Lundell rotating electric machines with neodymium magnets has a value in a given range which includes the boss portion cross-sectional area Ab. The given range is a range which satisfies the relationship of the following formula (34).

$$Ab \times 0.8 \leq As \leq Ab \times 1.2 \quad (34)$$

Figure 21:
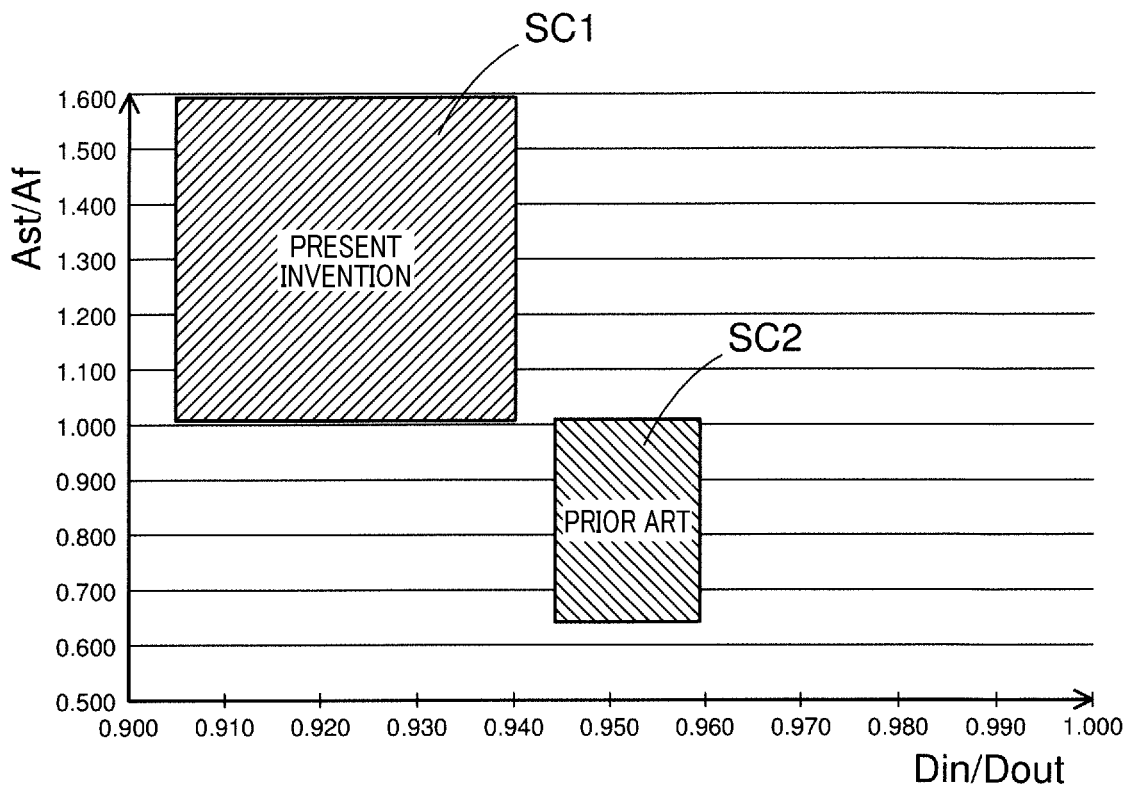
FIG. 21 is a graphical representation illustrating the relationship between the cross-sectional area ratio Ast/Af and the outer diameter ratio Din/Dout.

In FIG. 21, the vertical axis represents the cross-sectional area ratio (Ast/Af) between the magnetic path cross-sectional area Ast of the stator 20 and the magnetic path cross-sectional area Af of the rotor 30; the horizontal axis represents the outer diameter ratio (Din/Dout) between the inner diameter Din and the outer diameter Dout of the back yoke 24. The range of the cross-sectional area ratio (Ast/Af) is specified by the formula (14), and the range of the outer diameter ratio (Din/Dout) is specified by the formula (19). As made clear from FIG. 21, the range SC1 according to the present invention and the range SC2 according to the prior art deviate from each other without overlapping.

Figure 22:
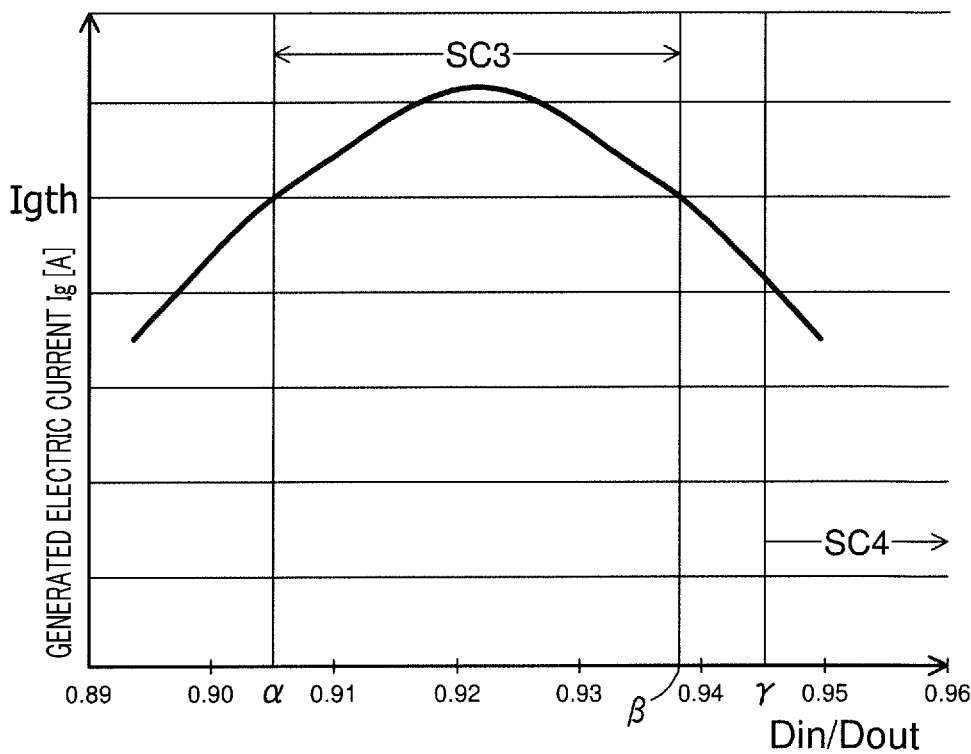
FIG. 22 is a graphical representation illustrating the relationship between the generated electric current Ig and the outer diameter ratio Din/Dout.

In FIG. 22, the vertical axis represents the generated electric current Ig; the horizontal axis represents the outer diameter ratio (Din/Dout) between the inner diameter Din and the outer diameter Dout of the back yoke 24. The range of the outer diameter ratio (Din/Dout) is specified by the formula (19). That is, the values of α, β and γ shown in FIG. 22 are such that α=0.905, β=0.938 and γ=0.945. In the range satisfying the formula (19), the generated electric current Ig is higher than or equal to a threshold current Igth. As made clear from FIG. 22, the range SC3 according to the present invention and the range SC4 according to the prior art deviate from each other without overlapping.

(Operational Effects of Present Embodiment)

According to the above-described first embodiment, by each of the permanent magnets 34 which is arranged between one circumferentially-adjacent pair of the claw-shaped magnetic pole portions 323, there are formed both the first magnet magnetic circuit 38 along which the magnetic flux flows to cross the stator 20 and the second magnet magnetic circuit 39 along which the magnetic flux flows to circulate within the rotor 30 through the boss portion 321. Moreover, when the rotor 30 is under load (i.e., when the field current If is supplied to the field coil 33), there is formed the d-axis magnetic circuit 36 along which the magnetic flux generated by the magnetomotive force of the field coil 33 flows through the boss portion 321 of the field core 32, one pair of the claw-shaped magnetic pole portions 323 and the stator core 21. At this time, the direction of the magnet magnetic flux flowing along the second magnet magnetic circuit 39 is opposite to the direction of the magnetic flux flowing along the d-axis magnetic circuit 36; therefore, the magnetic reluctance of the second magnet magnetic circuit 39 is high. In the present embodiment, the magnetic path cross-sectional area Ast of the stator 20 and the magnetic path cross-sectional area Af of the rotor 30 are set to satisfy the relationship of Ast>Af. Accordingly, the permeance Prt of the d-axis magnetic circuit 36 and the permeance Pst of the q-axis magnetic circuit 37 are set to satisfy the relationship of Prt<Pst. Therefore, the magnet magnetic flux flowing along the first magnet magnetic circuit 38 is increased. Consequently, it becomes possible to cause the magnet magnetic flux of the permanent magnets 34 to cross the stator 20, thereby effectively utilizing the magnet magnetic flux. As a result, it becomes possible to significantly improve the electric power generation capability of the automotive alternator 1.

The relationship between the magnetic path cross-sectional area Af of the rotor 30 and the magnetic pole portion surface area As is specified to satisfy Af<As. That is, the magnetic pole portion surface area As, which is the area of the surface of each of the claw-shaped magnetic pole portions 323 for exchanging magnetic flux with the stator core 21, is greater than the magnetic path cross-sectional area Af of the rotor 30. Consequently, it becomes possible to reliably perform exchange of the magnet magnetic flux of the permanent magnets 34 between the stator 20 and the rotor 30.

The magnetic path cross-sectional area Ab of the boss portion 321 per pole pair, the magnetic flux density B50 when a magnetic field of 5000 [A/m] is applied to the boss portion 321, the residual magnetic flux density Br of the permanent magnets 34 and the magnetic path cross-sectional area Am of each of the magnetic pole portions of the permanent magnets 34 are set to satisfy the relationship of 2×Br×Am<B50×Ab. Consequently, it becomes possible for the magnetic force generated by each of the permanent magnets 34 to be absorbed by the d-axis magnetic circuit 36. That is, it becomes possible to lower the counterelectromotive force, thereby suppressing electric power generated in a high-speed rotation state during a non-energization mode.

The permeance Prt of the d-axis magnetic circuit 36 and the permeance Pst of the q-axis magnetic circuit 37 are set to satisfy the relationship of Pst:Prt=2n:1. Consequently, it becomes possible to make the mode of the rotor 30, which is a Lundell rotor, under load approach the mode of an IPM rotor.

Moreover, it also becomes possible to make the salient pole ratio ρ, which is the inductance ratio Lq/Ld between the q-axis inductance Lq and the d-axis inductance Ld, greater than or equal to 2. Consequently, it becomes possible for the Lundell rotor 30 to output reluctance torque at the same level as that outputted by an IPM rotor.

The boss portion cross-sectional area Ab of the rotor 30 and the magnetic pole portion surface area As are set to satisfy the relationship of 0.9<As/Ab<1.7. That is, the magnetic pole portion surface area As is greater than the boss portion cross-sectional area Ab. In the prior art, permanent magnets are provided in rotors for rectification or leakage prevention of magnetic flux between circumferentially-adjacent claw-shaped magnetic pole portions. In contrast, in the rotor 30 according to the present embodiment, the magnet magnetic flux of the permanent magnets 34 crosses the stator 20, as in an IPM motor. Consequently, the permanent magnets 34 function, similarly to permanent magnets provided in an IPM motor, to increase the magnetic flux flowing to the stator 20 as well as to prevent leakage of the magnetic flux. That is, the magnet magnetic flux of the permanent magnets 34 contributes to improvement of the counterelectromotive force (i.e., power generation output) and improvement of the torque.

The magnetic path cross-sectional area Af of the rotor 30 and the magnetic pole portion surface area As are set to satisfy the relationship of 1.0<As/Af<1.6. That is, the magnetic pole portion surface area As is greater than the magnetic path cross-sectional area Af of the rotor 30. Consequently, it becomes possible for the field magnetic flux, which is generated by supply of the field current If to the field coil 33, to flow to the stator 20 via the boss portion 321, the disc portions 322 and the claw-shaped magnetic pole portions 323. Hence, the field magnetic flux generated in the boss portion 321 contributes to improvement of the counterelectromotive force (i.e., power generation output) and improvement of the torque.

The boss portion outer diameter Db and the rotor outer diameter Dr are set to satisfy the relationship of 0.46<Db/Dr<0.53. That is, the boss portion cross-sectional area Ab is in a range determined by fully considering the reaction of the magnet magnetic force to the magnetic force of the boss portion 321. Consequently, when the magnetic force of the boss portion 321, which can repel the reaction by the magnetic force of the permanent magnets 34, acts on the field core 32, it is possible to transfer both the total magnetic force of the boss portion 321 and the total magnetic force of the permanent magnets 34 to the stator 20 via the claw-shaped magnetic pole portions 323.

The residual magnetic flux density Br of the permanent magnets 34 is set to be higher than or equal to 1 [T]. In the case of the permanent magnets 34 being implemented by neodymium-iron-boron bonded magnets or plastic molded magnets formed by samarium-iron-nitrogen injection molding, it may be impossible to sufficiently supply the demagnetizing magnetic field to the field core 32. That is, in many cases, the space of the field coil 33 is reduced for securing the cross-sectional area of the magnets. Therefore, the above-described operational effects can be effectively achieved particularly when the residual magnetic flux density Br of the permanent magnets 34 is higher than or equal to 1 [T].

Those portions of the field core 32 where the d-axis magnetic circuit 36 is formed are formed of two types of materials having different saturation flux densities Bs. Specifically, in the field core 32, the claw-shaped magnetic pole portions 323 are formed of a material having relatively high saturation flux density Bs whereas the other portions than the claw-shaped magnetic pole portions 323 are formed of a material having relatively low saturation flux density Bs. Consequently, the boss portion 321 can be easily magnetically saturated and thus the behavior of magnetic flux characteristics of the rotor 30 can be easily changed to that of an IPM rotor. As a result, it is possible to more reliably improve the electric power generation capability of the automotive alternator 1.

In the field core 32, the material of low saturation flux density Bs used for forming the other portions than the claw-shaped magnetic pole portions 323 is higher in magnetic permeability than the material of high saturation flux density Bs used for forming the claw-shaped magnetic pole portions 323. Consequently, it becomes possible to improve the effects of absorbing the counterelectromotive force when no load is applied to the rotor 30.

Second Embodiment

The second embodiment will be described with reference to FIGS. 23-30. A rotating electric machine according to the present embodiment is an automotive alternator 2 that is installed in a vehicle and used as an electric generator. In addition, unless specified otherwise, components identical to those employed in the first embodiment are marked with the same reference numerals as in the first embodiment and description thereof is omitted hereinafter. Accordingly, the differences of the present embodiment from the first embodiment will be mainly described hereinafter; the formulas described in the first embodiment will also be applied to the present embodiment.

(Overall Configuration of Automotive Alternator)

Figure 23:
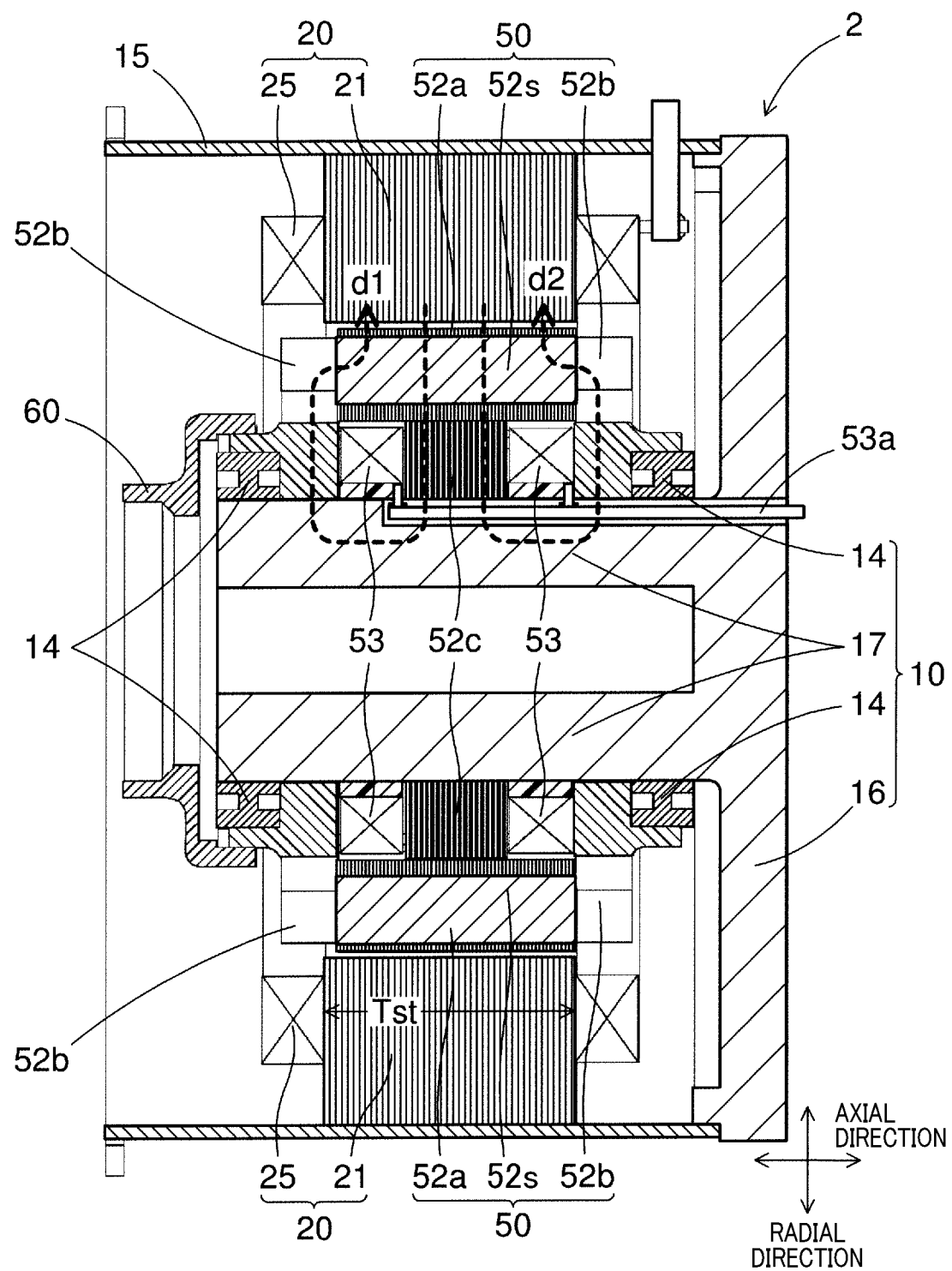
FIG. 23 is a cross-sectional view, taken along the line XXIII-XXIII in FIG. 27, of a rotating electric machine according to a second embodiment.

As shown in FIG. 23, the automotive alternator 2 is a brushless rotating electric machine. The automotive alternator 2 includes a housing 10, a stator 20, a rotor 50 and a connecting member 60.

The housing 10 has a tubular part 15 and a cover part 16. The housing 10 receives therein and supports the stator 20, the rotor 50 and the connecting member 60. In the present embodiment, the tubular member 15 is hollow cylindrical-shaped. The cover part 16 is a disc-shaped soft-magnetic body and fitted and fixed to an opening of the tubular member 15 on one end side. The cover part 16 has a boss portion 17 arranged to protrude from a radial central portion thereof to one axial side (i.e., left side in FIG. 23). The boss portion 17 is located, on the radially inner side of the tubular part 15 (i.e., the radially opposite side to the stator 20), coaxially with the tubular part 15.

A pair of field coils 53 are wound on the radially outer side (i.e., stator 20 side) of an axial central part of the boss portion 17. The pair of field coils 53 are insulated from the boss portion 17 and wound in a state of being parallel connected and axially spaced. The pair of field coils 53 are connected, via an output wire 53a, to a power supply (not shown) that supplies field current If. Upon the field current If flowing in the pair of field coils 53, a magnetomotive force is generated.

The stator 20 of the present embodiment is identical to the stator 20 of the first embodiment except that a radially outer surface of the stator core 21 is fixed to a radially inner surface of the tubular part 15 of the housing 10 in the present embodiment.

The rotor 50 is rotatably supported by the boss portion 17 via a pair of bearings 14. The rotor 50 is located on the radially outer side (i.e., stator 20 side) of the pair of field coils 53 and arranged to face the stator 20. In the present embodiment, the pair of bearings 14 are respectively provided on two axial end parts of the boss portion 17.

The rotor 50 is driven to rotate by an engine (not shown) of the vehicle via the connecting member 60 and a not-shown drive power transmission means. The connecting member 60 is fitted and fixed to an N pole core 52b on the front side (i.e., left side in FIG. 23).

Figure 24:
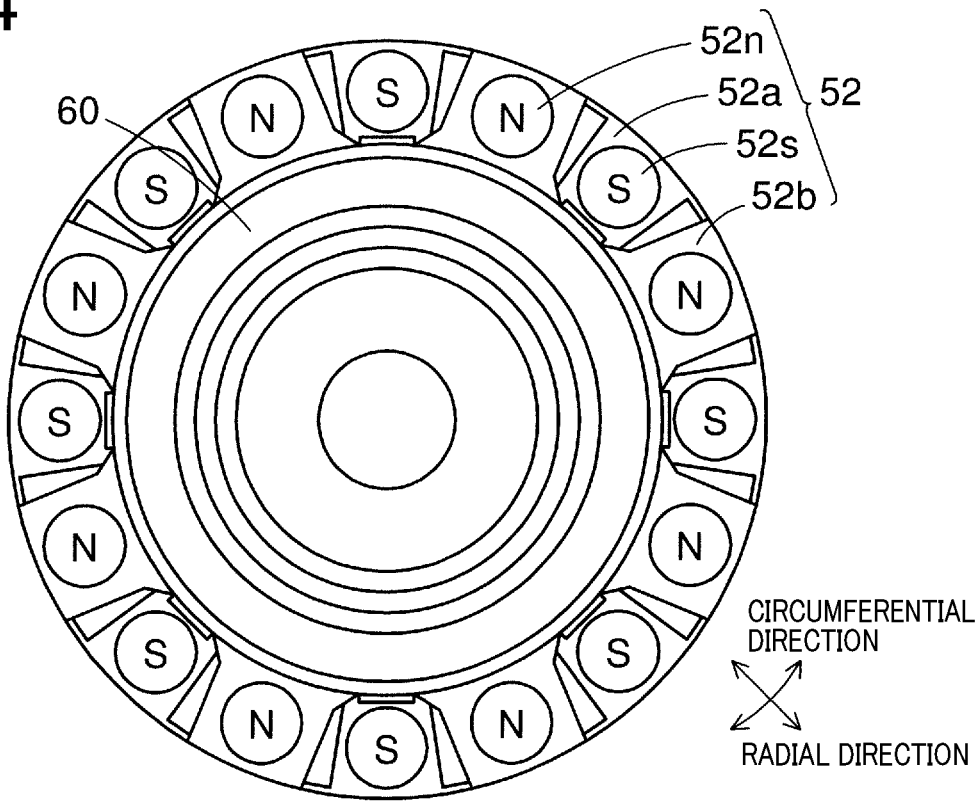
FIG. 24 is a schematic view illustrating the configuration of a rotor of the rotating electric machine according to the second embodiment.
Figure 25:
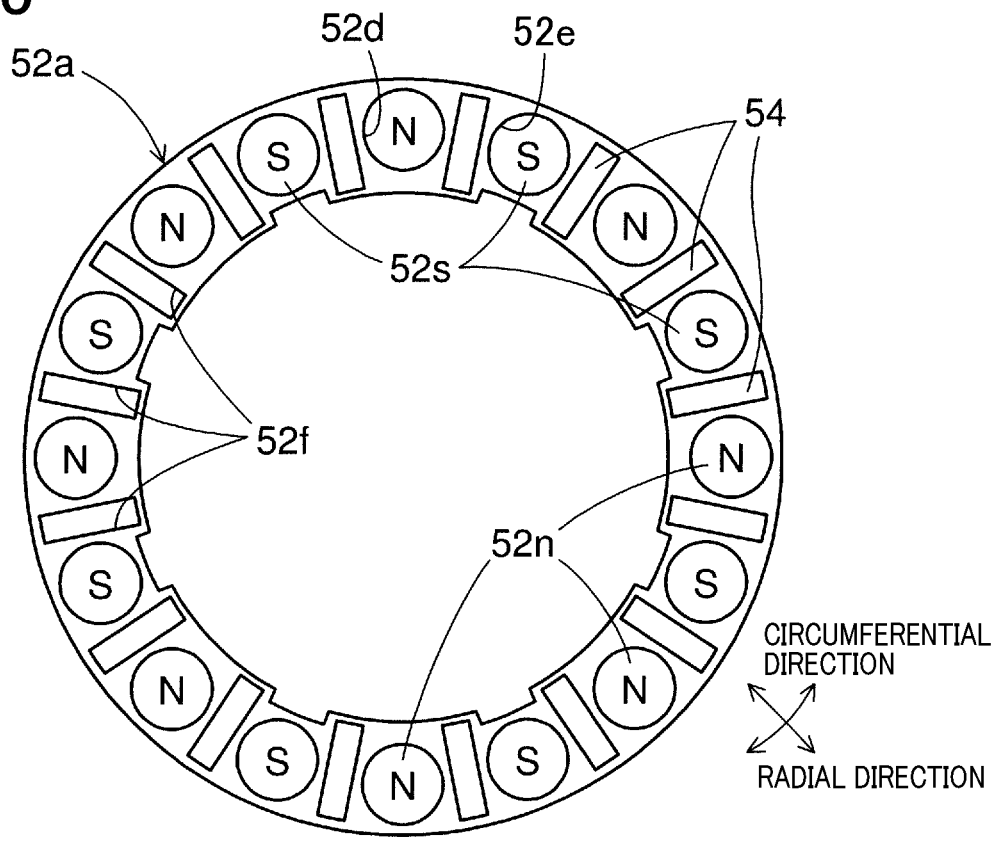
FIG. 25 is a schematic view illustrating the configuration of an iron core included in the rotor of the rotating electric machine according to the second embodiment.

The rotor 50 shown in FIGS. 23-26 includes a field core 52 and a plurality of permanent magnets 54. As shown in FIGS. 24 and 25, the field core 52, which is of a tandem type, includes an iron core 52a, a pair of N pole cores 52b and an S pole core 52c. The plurality of permanent magnets 54 are each embedded in the iron core 52a.

As shown in FIG. 25, the iron core 52a is a hollow cylindrical soft-magnetic body. The iron core 52a has a plurality of N-pole holes 52d, a plurality of S-pole holes 52e and a plurality of magnet-receiving holes 52f.

The N-pole holes 52d are holes for inserting and arranging N poles 52n respectively therein. The S-pole holes 52e are holes for inserting and arranging S poles 52s respectively therein. In the present embodiment, each of the N-pole holes 52d and the S-pole holes 52e is a through-hole having a circular cross section. In addition, each of the N poles 52n and the S pole 52s corresponds to a "magnetic pole portion".

The magnet-receiving holes 52f are holes having a rectangular cross section, which are provided to respectively have the permanent magnets 54 received and embedded therein. In the present embodiment, the number of the N-pole holes 52d and the number of the S-pole holes 52e are each set to 8; the number of the magnet-receiving holes 52f is set to 16. Accordingly, the number of the permanent magnets 54 is equal to 16.

The N-pole holes 52d and the S-pole holes 52e are alternately arranged and spaced in the circumferential direction. Each of the N-pole holes 52d and the S-pole holes 52e is formed to extend parallel to a central axis of the iron core 52a. Consequently, the N poles 52n received in the N-pole holes 52d and the S poles 52s received in the S-pole holes 52e axially extend on the radially outer side of the boss portion 17 and are alternately arranged in the circumferential direction. Each of the magnet-receiving holes 52f is formed between and apart from one adjacent pair of the N-pole and S-pole holes 52d and 52e.

Figure 26:
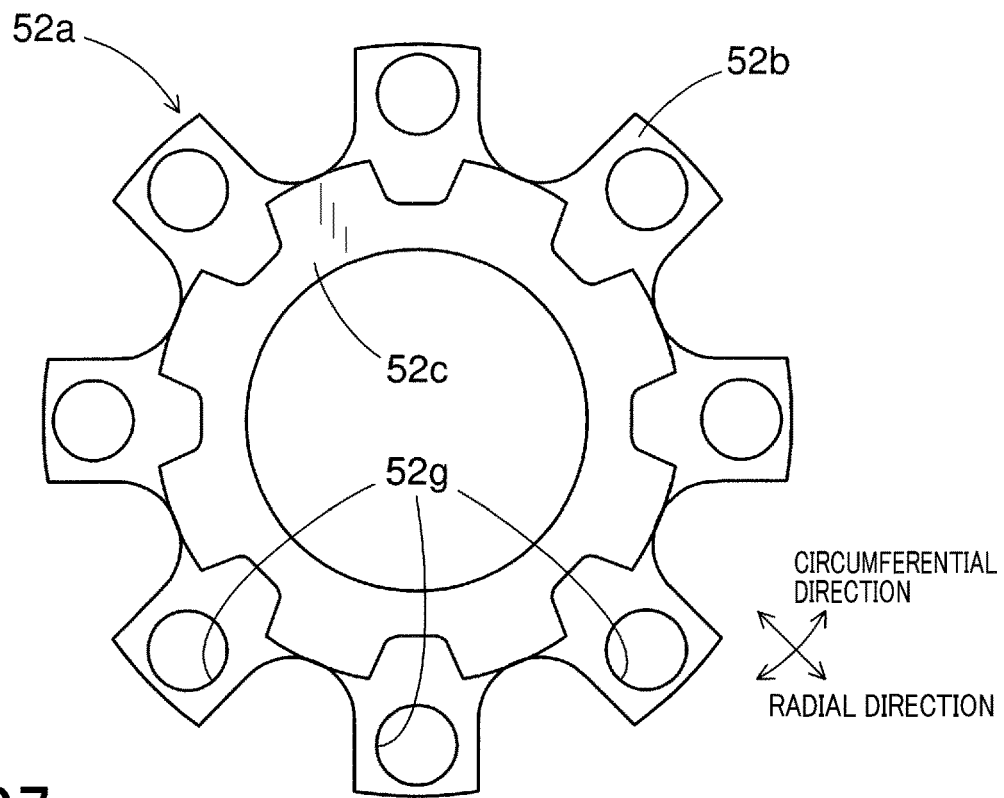
FIG. 26 is a schematic view illustrating the configuration of N and S pole cores included in the rotor of the rotating electric machine according to the second embodiment.
Figure 27:
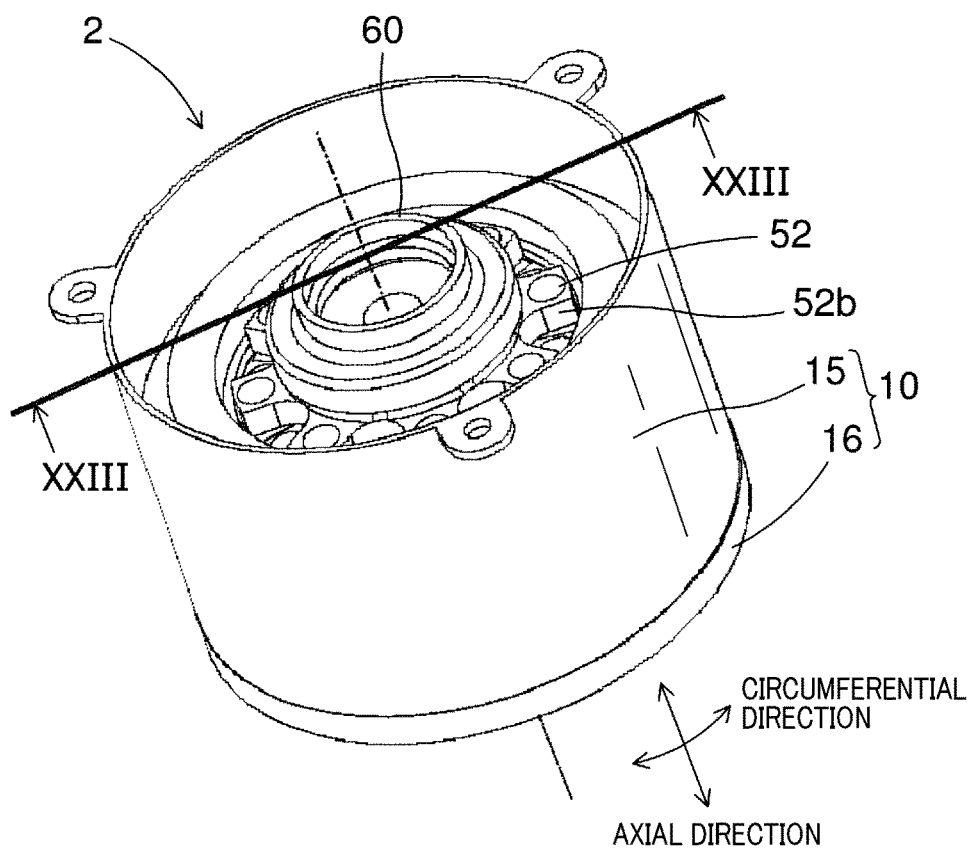
FIG. 27 is a perspective view of the rotating electric machine according to the second embodiment.
Figure 28:
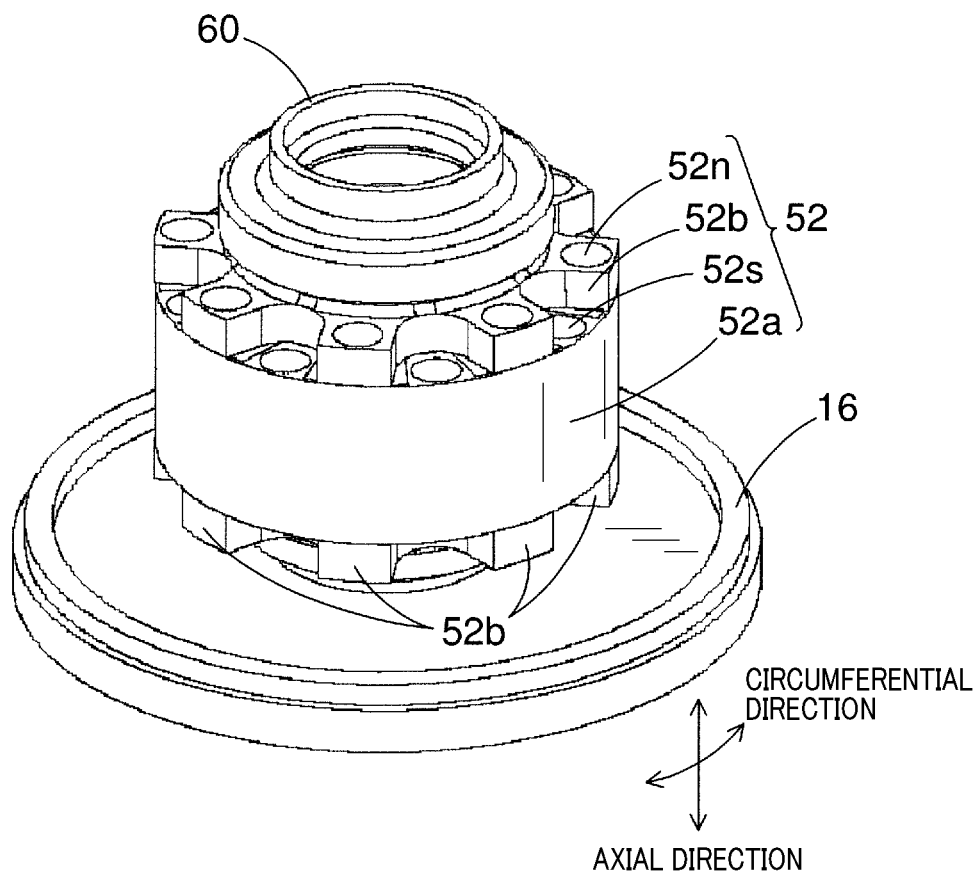
FIG. 28 is a perspective view of the rotating electric machine according to the second embodiment, omitting a cylindrical portion of a housing.

As shown in FIG. 26, each of the N pole cores 52b is an annular soft-magnetic body. Moreover, as shown in FIG. 23, each of the N pole cores 52b is rotatably provided with its inner circumferential surface apart from an outer circumferential surface of the boss portion 17 by a given fine distance. As shown in FIGS. 23, 27 and 28, between the pair of N pole cores 52b, there is axially sandwiched the iron core 52a.

In a radially outer peripheral part of each of the N pole cores 52b, a plurality of recesses each being recessed radially inward and a plurality of protrusions each protruding radially outward are formed alternately in the circumferential direction. In the present embodiment, the number of the recesses and the number of the protrusions are each set to 8. In each of the protrusions, there is formed a holding hole 52g for holding an end portion of a corresponding one of the N poles 52n.

Each of the N poles 52n has its axial intermediate portion inserted in a corresponding one of the N-pole holes 52d and its two axial end portions respectively held in corresponding ones of the holding holes 52g of the pair of N pole cores 52b.

As shown in FIG. 26, the S pole core 52c is an annular soft-magnetic body. The S pole core 52c has the same inner diameter as the N pole cores 52b. As shown in FIG. 23, the S pole core 52c is arranged between the pair of field coils 53. Moreover, the S pole core 52c is rotatably provided with its inner circumferential surface apart from the outer circumferential surface of an axial central part of the boss portion 17 by a given fine distance.

In a radially outer peripheral part of the S pole core 52c, a plurality of recesses and a plurality of protrusions are formed alternately in the circumferential direction, as in the radially outer peripheral parts of the N pole cores 52b. In the present embodiment, the number of the recesses and the number of the protrusions are each set to 8.

As shown in FIG. 26, protruding distal end surfaces (i.e., radially outer surfaces) of the protrusions of the S pole core 52c are located at the same radial position as bottom surfaces of the recesses of the N pole cores 52b. As shown in FIG. 23, the S pole core 52c is arranged to have the protruding distal end surfaces of the protrusions in contact with an inner circumferential surface of the iron core 52a. Consequently, the S pole core 52c is magnetically connected with the S poles 52s received in the S-pole holes 52e via the iron core 52a.

Each of the permanent magnets 54 has a cuboid external shape and thus a rectangular cross section. As shown in FIG. 25, each of the permanent magnets 54 is embedded in one of the magnet-receiving holes 52f formed in the iron core 52a. Each of the permanent magnets 54 is arranged between one circumferentially-adjacent pair of the magnetic pole portions (i.e., the N poles 52n and the S poles 52s) with its axis of easy magnetization oriented in the circumferential direction. In each of the permanent magnets 54, magnetic poles are formed so as to match the polarities induced in the pair of the magnetic pole portions by the magnetomotive force of the field coils 53. By the magnet magnetic flux generated by each of the permanent magnets 54 arranged as described, there are formed both a first magnet magnetic circuit 58 and a second magnet magnetic circuit 59 as shown in FIG. 29.

The magnetic path cross-sectional area Af [mm$^2$] of the rotor 50 is the minimum cross-sectional area per pole of the boss portion 17, the N pole core 52b and the S pole core 52c shown in FIG. 23. More specifically, the magnetic path cross-sectional area Af [mm$^2$] of the rotor 50 is represented by the value obtained by dividing the area of a minimum one of cross sections of the boss portion 17, the N pole core 52b and the S pole core 52c, which are taken along the radial direction, by the number of pole pairs. The magnetic pole portion surface area As [mm²] of the rotor 50 is the area of the surface of each of the N poles 52n and the S pole 52s for exchanging magnetic flux with the stator core 21. The relationship between the magnetic path cross-sectional area Af and the magnetic pole portion surface area As of the rotor 50 are specified to satisfy the following formula (35).

$$Af \leq As \tag{35}$$

Figure 29:
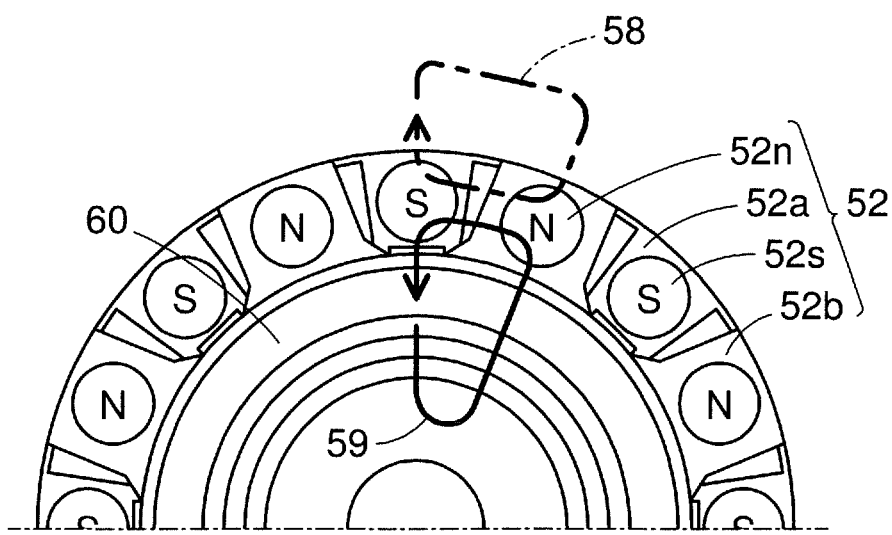
FIG. 29 is a schematic view illustrating two magnetic circuits formed by each permanent magnet in the rotating electric machine according to the second embodiment.

The first magnet magnetic circuit 58 shown with a one-dot chain line in FIG. 29 is a magnetic circuit along which the magnet magnetic flux flows through both the rotor 50 and the stator core 21. More specifically, the magnet magnetic flux flows through the N pole 52n of the iron core 52a, the permanent magnet 54 and the S pole 52s, and then returns to the N pole 52n of the iron core 52a via the stator core 21 shown in FIG. 23. Since the magnet magnetic flux of the permanent magnets 54 flowing along the first magnet magnetic circuit 58 crosses the stator 20, it contributes to improvement of the counterelectromotive force and improvement of the torque.

The second magnet magnetic circuit 59 shown with a solid line in FIG. 29 is a magnetic circuit along which the magnet magnetic flux flows within the rotor 50 and which is thus completed within the rotor 50. More specifically, the magnet magnetic flux flows through the N pole 52n of the iron core 52a, the permanent magnet 54 and the S pole 52s, and then returns to the N pole 52n of the iron core 52a via the S pole core 52c, the boss portion 17 and the N pole cores 52b. Since the magnet magnetic flux of the permanent magnets 54 flowing along the second magnet magnetic circuit 59 does not cross the stator 20, it contributes to neither improvement of the counterelectromotive force nor improvement of the torque.

Upon supply of the field current If from a not-shown field current control circuit to the field coils 53, magnetomotive force is generated in the boss portion 17, magnetizing the N poles 52n into N polarity and the S poles 52s into S polarity. Consequently, a d-axis magnetic circuit 56 is formed as shown with a dashed line FIG. 30. Along the d-axis magnetic circuit 56, magnetic flux flows from the boss portion 17 of the housing 10, through the S pole core 52c, the S pole 52s of the iron core 52a, the stator core 21, the N pole 52n of the iron core 52a and the pair of N pole cores 52b, and back to the boss portion 17.

As shown in FIG. 23, after the d-axis magnetic circuit 56 passes through the S pole core 52c at the axial central part, the N-pole direction of the d axis is inverted on both the axial sides. Therefore, the d-axis magnetic circuit 56 diverges into two magnetic circuits, i.e., a magnetic circuit d1 and a magnetic circuit d2. The d-axis magnetic circuit 56 is a magnetic circuit which causes counterelectromotive force in the field coils 53 of the rotor 50.

Figure 30:
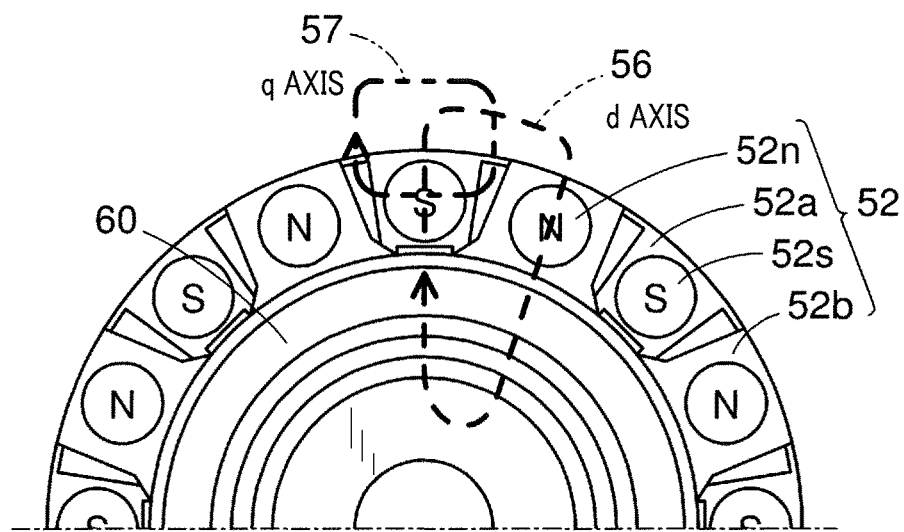
FIG. 30 is a schematic view illustrating both a d-axis magnetic circuit and a q-axis magnetic circuit formed in the rotating electric machine according to the second embodiment.

Moreover, upon electric current being induced by the magnetic flux, which flows along the d-axis magnetic circuit 56 and the first magnet magnetic circuit 58 to cross the stator 20, to flow in the armature coil 25, a q-axis magnetic circuit 57 is formed which is shown with a two-dot chain line in FIG. 30. The q-axis magnetic circuit 57 is formed by magnetic flux flowing through the q axis of the stator core 21; the q axis is located at a position offset from the d axis by 90° in electrical angle.

In the present embodiment, the relationship between the permeance Prt of the d-axis magnetic circuit 56 and the permeance Pst of the q-axis magnetic circuit 57 is specified to satisfy the formulas (16) and (18) when the rotor 50 is under load, as in the first embodiment. Consequently, it becomes possible to make the mode of the rotor 50 under load approach the mode of an IPM rotor; thus it becomes possible to make the salient pole ratio ρ higher than or equal to 2 when the rotor 30 is under load. In addition, the measurement method of the permeances Prt and Pst is the same as that described in the first embodiment.

In the present embodiment, the d-axis magnetic circuit 56 and the first magnet magnetic circuit 58 share a magnetic path from the S pole 52s, via the iron core 52a, the stator 20 and the iron core 52a, to the N pole 52n. Moreover, the d-axis magnetic circuit 56 and the second magnet magnetic circuit 59 share a magnetic path from the S pole 52s of the rotor 50, via the iron core 52a, the S pole core 52c, the boss portion 17 and the pair of N pole cores 52b, to the N pole 52n. That is, the d-axis magnetic circuit 56 shares, in part thereof, a magnetic path with the first magnet magnetic circuit 58 and the second magnet magnetic circuit 59. Consequently, the material variation of the pair of N pole cores 52b can be considered based on the range of the allowable amount of magnetic flux of the single S pole core 52c, improving the robustness.

In the present embodiment, the magnetic path cross-sectional area Ab of the boss portion 17 per pole pair, the magnetic flux density B50 when a magnetic field of 5000 [A/m] is applied to the boss portion 17, the residual magnetic flux density Br of the permanent magnets 54 arranged between the N poles 52n and the S poles 52s, and the magnetic path cross-sectional area Am (i.e., the area of each of the surfaces constituting the magnetic poles) of each of the magnetic pole portions of the permanent magnets 54 are set to satisfy the relationship of the formula (18), as in the first embodiment.

Moreover, those portions of the field core 52 and the housing 10 where the d-axis magnetic circuit 56 is formed are formed of two types of materials having different saturation flux densities Bs. Specifically, in the second embodiment, the N poles 52n and the S poles 52s, which constitute the magnetic pole portions, are formed of a material having relatively high saturation flux density Bs, whereas the boss portion 17 and the other portions of the field core 52 than the N poles 52n and the S poles 52s are formed of a material having relatively low saturation flux density Bs. Examples of the material having relatively high saturation flux density Bs and the material having relatively low saturation flux density Bs are the same as those described in the first embodiment.

(Operational Effects of Present Embodiment)

According to the above-described second embodiment, in the automotive alternator 2, the permeance Prt of the d-axis magnetic circuit 56 and the permeance Pst of the q-axis magnetic circuit 57 are set to satisfy the relationship of Prt<Pst when the rotor 50 is under load. Therefore, as in the first embodiment, the magnet magnetic flux flowing along the first magnet magnetic circuit 58 is increased; the first magnet magnetic circuit 58 is formed by the magnetic flux flowing in the same direction as the d-axis magnetic circuit 56 to cross the stator 20. Consequently, it becomes possible to effectively utilize the magnet magnetic flux of the permanent magnets 54, thereby significantly improving the electric power generation capability of the automotive alternator 2.

The boss portion cross-sectional area Ab, the magnetic flux density B50 when a magnetic field of 5000 [A/m] is applied to the boss portion 17, the residual magnetic flux density Br of the permanent magnets 54, and the magnetic path cross-sectional area Am of each of the magnetic pole portions of the permanent magnets 54 are set to satisfy the relationship of 2×Br×Am<B50×Ab. Consequently, it becomes possible to effectively short-circuit the magnet magnetic flux of the permanent magnets 54 to the boss portion 17 side, thereby suppressing the electric power generation when no load is applied to the rotor 50. Moreover, as in the first embodiment, it becomes possible to lower the counterelectromotive force, thereby suppressing electric power generated in a high-speed rotation state during a non-energization mode.

The permeance Prt of the d-axis magnetic circuit 56 and the permeance Pst of the q-axis magnetic circuit 57 are set to satisfy the relationship of Pst:Prt=2n:1. Consequently, as in the first embodiment, it becomes possible to make the salient pole ratio ρ higher than or equal to 2, thereby enabling the Lundell rotor 50 to output reluctance torque at the same level as that outputted by an IPM rotor.

The field core 52, where the d-axis magnetic circuit 56 is formed by the magnetomotive force of the field coil 53, is formed of two types of materials having different saturation flux densities Bs. Specifically, the N poles 52n and the S poles 52s are formed of a material having relatively high saturation flux density Bs, whereas the other portions of the field core 52 than the N poles 52n and the S poles 52s are formed of a material having relatively low saturation flux density Bs. Consequently, the boss portion 17 can be immediately magnetically saturated and thus the behavior of magnetic flux characteristics of the rotor 50 can be easily changed to that of an IPM rotor. As a result, it is possible to more reliably improve the electric power generation capability of the automotive alternator 2.

The material of low saturation flux density Bs used for forming the other portions of the field core 52 than the N poles 52n and the S poles 52s is higher in magnetic permeability than the material of high saturation flux density Bs used for forming the N poles 52n and the S poles 52s. Consequently, it becomes possible to improve the effects of absorbing the counterelectromotive force when no load is applied to the rotor 50.

Other Embodiments

In addition, the present invention is not limited to the above-described embodiments, and various modifications may be made without departing from the spirit of the present invention.

For example, in the above-described first and second embodiments, the present invention is applied to the automotive alternators 1 and 2. However, the present invention can also be applied to other rotating electric machines, such as an electric motor or a motor-generator that can selectively function either as an electric motor or as an electric generator.

In the above-described first and second embodiments, the present invention is applied to the automotive alternators 1 and 2 that are each configured as an inner-rotor rotating electric machine in which: the stator 20 is arranged on the radially outer side; and the rotor 30 or 50 is arranged on the radially inner side. However, the present invention can also be applied to an outer-rotor rotating electric machine in which: a stator is arranged on the radially inner side; and a rotor is arranged on the radially outer side.

In the above-described first and second embodiments, the d-axis magnetic circuit 36 or 56 shares a magnetic circuit with the first magnet magnetic circuit 38 or 58 and the second magnet magnetic circuit 39 or 59 in at least parts thereof. However, the d-axis magnetic circuit 36 or 56 may share a whole magnetic path with the first magnet magnetic circuit 38 or 58 and the second magnet magnetic circuit 39 or 59. Specifically, the permanent magnets 34 or 54 may be embedded or arranged in the d-axis magnetic circuit 36 or 56. For example, in a modification shown in FIG. 31, a cylindrical permanent magnet 34A, which has magnetic poles formed at both axial end portions thereof, is coaxially arranged on the radially outer periphery of the boss portion 321 of the field core 32 where the d-axis magnetic circuit 36 is formed. Consequently, the d-axis magnetic circuit 36 shown in FIG. 8 and a first magnet magnetic circuit 38A shown in FIG. 31 share a whole magnetic path. With this configuration, the centrifugal force of the permanent magnet will be applied to the field core 32, thereby preventing anti-centrifugal force characteristics from being degraded. Regarding the others, it is possible to achieve the same operational effects as those described in the first and second embodiments.

Figure 31:
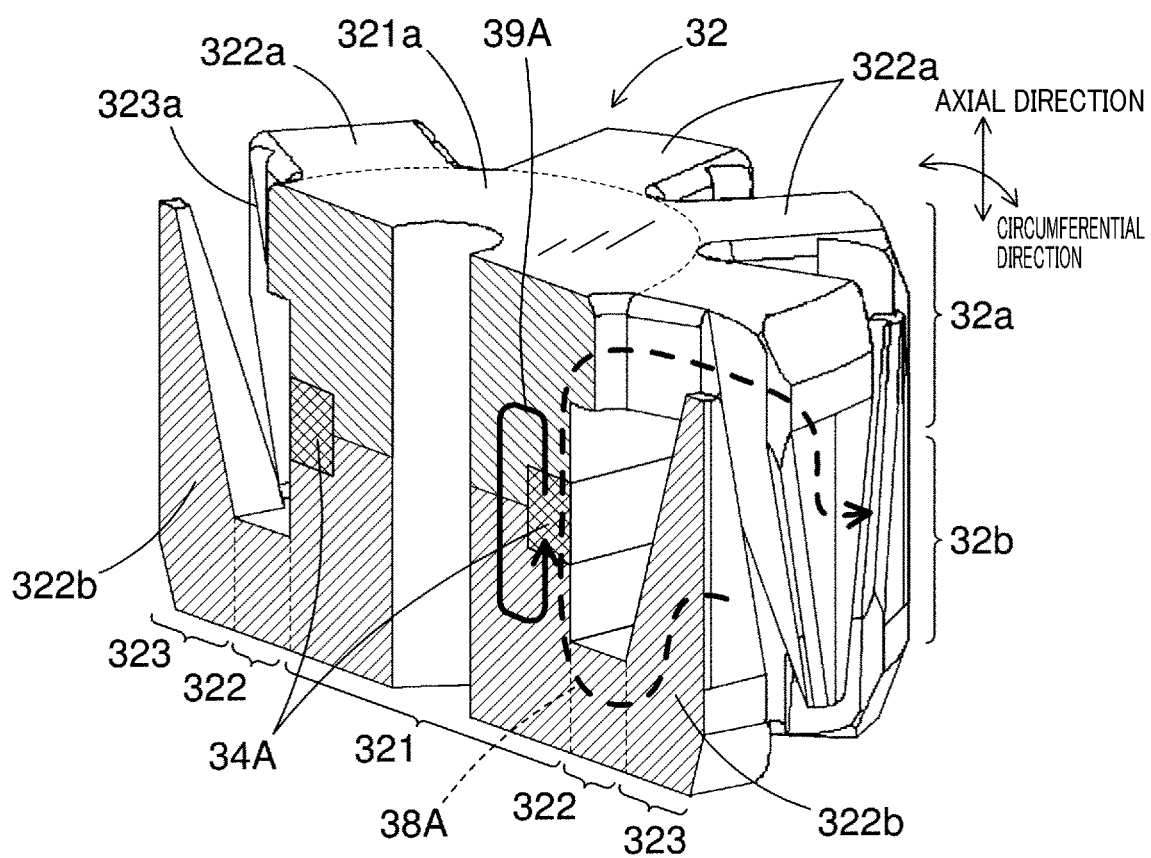
FIG. 31 is a schematic view illustrating the arrangement of permanent magnets in a rotating electric machine according to a modification.

In the above-described first embodiment, each of the permanent magnets 34 is arranged between one circumferentially-adjacent pair of the claw-shaped magnetic pole portions 323. Alternatively, permanent magnets 34 may be embedded in the field core 32. For example, a permanent magnet(s) may be embedded in the boss portion 321 of the field core 32 as shown in FIG. 31, in the disc portions 322 of the field core 32 or in the claw-shaped magnetic pole portions 323 of the field core 32. In the case of embedding permanent magnets in the disc portions 322 where the d-axis magnetic circuit 36 shown in FIG. 8 is formed, each of the cross-sectional areas of the disc portions 322 and the claw-shaped magnetic pole portions 323 is a cross-sectional area minus the permanent magnets. This modification can also be applied to the permanent magnets 54 arranged between the circumferentially-adjacent N and S poles 52n and 52s in the second embodiment. That is, the permanent magnets 54 may be embedded in the field core 52. In any cases, with the permanent magnet(s) provided in the d-axis magnetic circuit 36, it is possible to achieve the same operational effects as those described in the first and second embodiments.

What is claimed is:
1. A rotating electric machine comprising:
a stator having an armature coil wound on a stator core; and
a rotor provided rotatably and having a field coil configured to be energized via brushes,
wherein
the rotor includes:
a field core having a cylindrical boss portion on which the field coil is wound and a plurality of claw-shaped magnetic pole portions located on the stator side of the boss portion, the claw-shaped magnetic pole portions respectively forming magnetic poles polarities of which are alternately different in a circumferential direction; and
a plurality of permanent magnets each of which is arranged between one circumferentially-adjacent pair of the claw-shaped magnetic pole portions with its axis of easy magnetization oriented in the circumferential direction, each of the permanent magnets having magnetic poles formed therein so as to match the polarities induced in the pair of claw-shaped magnetic pole portions by magnetomotive force of the field coil,
wherein
a d-axis magnetic circuit and a magnet magnetic circuit share a magnetic path in at least parts thereof,
along the d-axis magnetic circuit, magnetic flux generated by the magnetomotive force of the field coil flows through the boss portion, one pair of the claw-shaped magnetic pole portions and the stator core, along the magnet magnetic circuit, magnetic flux generated by magnetic force of a corresponding one of the permanent magnets flows, a relationship of Ast>Af is satisfied, where Ast is a magnetic path cross-sectional area of the stator and Af is a magnetic path cross-sectional area of the rotor, and a relationship of Af<As is satisfied, where Af is the magnetic path cross-sectional area of the rotor and As is the area of a surface of each of the claw-shaped magnetic pole portions via which the claw-shaped magnetic pole portion exchanges magnetic flux with the stator core.

2. A rotating electric machine comprising:

a stator having an armature coil wound on a stator core; and a rotor provided rotatably and having a field coil configured to be energized via brushes, wherein the rotor includes:

a field core having a cylindrical boss portion on which the field coil is wound and a plurality of claw-shaped magnetic pole portions located on the stator side of the boss portion, the claw-shaped magnetic pole portions respectively forming magnetic poles polarities of which are alternately different in a circumferential direction; and a plurality of permanent magnets each of which is arranged between one circumferentially-adjacent pair of the claw-shaped magnetic pole portions with its axis of easy magnetization oriented in the circumferential direction, each of the permanent magnets having magnetic poles formed therein so as to match the polarities induced in the pair of claw-shaped magnetic pole portions by magnetomotive force of the field coil, wherein a d-axis magnetic circuit and a magnet magnetic circuit share a magnetic path in at least parts thereof, along the d-axis magnetic circuit, magnetic flux generated by the magnetomotive force of the field coil flows through the boss portion, one pair of the claw-shaped magnetic pole portions and the stator core, along the magnet magnetic circuit, magnetic flux generated by magnetic force of a corresponding one of the permanent magnets flows, a relationship of Ast>Af is satisfied, where Ast is a magnetic path cross-sectional area of the stator and Af is a magnetic path cross-sectional area of the rotor, and a relationship of 2×Br×Am<B50×Ab is satisfied, where Ab is a magnetic path cross-sectional area of the boss portion per pole pair, B50 is magnetic flux density when a magnetic field of 5000 [A/m] is applied to the boss portion, Br is residual magnetic flux density of the permanent magnets and Am is a magnetic path cross-sectional area of each of magnetic pole portions of the permanent magnets.

3. A rotating electric machine comprising:

a stator having an armature coil wound on a stator core; and a rotor provided rotatably and having a field coil configured to be energized via brushes, wherein the rotor includes:

a field core having a cylindrical boss portion on which the field coil is wound and a plurality of claw-shaped magnetic pole portions located on the stator side of the boss portion, the claw-shaped magnetic pole portions respectively forming magnetic poles polarities of which are alternately different in a circumferential direction; and a plurality of permanent magnets each of which is arranged between one circumferentially-adjacent pair of the claw-shaped magnetic pole portions with its axis of easy magnetization oriented in the circumferential direction, each of the permanent magnets having magnetic poles formed therein so as to match the polarities induced in the pair of claw-shaped magnetic pole portions by magnetomotive force of the field coil, wherein a relationship of 1.0<Ast/Af<1.6 is satisfied, where Af is a magnetic path cross-sectional area of the rotor and Ast is a magnetic path cross-sectional area of the stator, and a relationship of Af≤As is satisfied, where Af is the magnetic path cross-sectional area of the rotor and As is the area of a surface of each of the claw-shaped magnetic pole portions via which the claw-shaped magnetic pole portion exchanges magnetic flux with the stator core.

4. The rotating electric machine as set forth in claim 3, wherein the stator core has a back yoke and a plurality of teeth radially extending from the back yoke to the rotor side, and a relationship of 0.905<Din/Dout<0.938 is satisfied, where Dout is an outer diameter of the back yoke and Din is an inner diameter of the back yoke.

5. A brushless rotating electric machine comprising:

a stator having an armature coil wound on a stator core;

a rotor rotatably arranged to radially face the stator; and a housing that receives therein and supports the stator and the rotor, wherein the housing has a boss portion which is located on a radially opposite side to the stator and on which a field coil is wound, wherein the rotor includes:

a field core having a plurality of magnetic pole portions located closer than the field coil to the stator, the magnetic pole portions respectively forming magnetic poles polarities of which are alternately different in a circumferential direction; and a plurality of permanent magnets each of which is arranged between one circumferentially-adjacent pair of the magnetic pole portions with its axis of easy magnetization oriented in the circumferential direction, each of the permanent magnets having magnetic poles formed therein so as to match the polarities induced in the pair of magnetic pole portions by magnetomotive force of the field coil, wherein a d-axis magnetic circuit and a magnet magnetic circuit share a magnetic path in at least parts thereof, along the d-axis magnetic circuit, magnetic flux generated by the magnetomotive force of the field coil flows through the boss portion, one pair of the magnetic pole portions and the stator core, along the magnet magnetic circuit, magnetic flux generated by magnetic force of a corresponding one of the permanent magnets flows, a relationship of Af<As is satisfied, where Af is a magnetic path cross-sectional area of the rotor and As is the area of a surface of each of the magnetic pole portions via which the magnetic pole portion exchanges magnetic flux with the stator core, and a relationship of Ast>Af is satisfied, where Ast is a magnetic path cross-sectional area of the stator and Af is the magnetic path cross-sectional area of the rotor.

6. The brushless rotating electric machine as set forth in claim 5, wherein a relationship of Prt<Pst is satisfied when the rotor is under load, where Prt is permeance of the d-axis magnetic circuit and Pst is permeance of a q-axis magnetic circuit, the q-axis magnetic circuit being formed by electric current flowing in the armature coil and extending through a q axis that is located at a position offset from the d axis by 90° in electrical angle.

7. The rotating electric machine as set forth in claim 5, wherein the stator core has a back yoke and a plurality of teeth radially extending from the back yoke to the rotor side, and a relationship of 0.905<Din/Dout<0.938 is satisfied, where Dout is an outer diameter of the back yoke and Din is an inner diameter of the back yoke.

8. A brushless rotating electric machine comprising:
a stator having an armature coil wound on a stator core;
a rotor rotatably arranged to radially face the stator; and
a housing that receives therein and supports the stator and the rotor,
wherein
the housing has a boss portion which is located on a radially opposite side to the stator and on which a field coil is wound,
wherein
the rotor includes:
a field core having a plurality of magnetic pole portions located closer than the field coil to the stator, the magnetic pole portions respectively forming magnetic poles polarities of which are alternately different in a circumferential direction; and
a plurality of permanent magnets each of which is arranged between one circumferentially-adjacent pair of the magnetic pole portions with its axis of easy magnetization oriented in the circumferential direction, each of the permanent magnets having magnetic poles formed therein so as to match the polarities induced in the pair of magnetic pole portions by magnetomotive force of the field coil,
wherein
a relationship of 1.0<Ast/Af<1.6 is satisfied, where Af is a magnetic path cross-sectional area of the rotor and Ast is a magnetic path cross-sectional area of the stator, and a relationship of Af≤As is satisfied, where Af is the magnetic path cross-sectional area of the rotor and As is the area of a surface of each of the magnetic pole portions via which the magnetic pole portion exchanges magnetic flux with the stator core.

9. The rotating electric machine as set forth in claim 8, wherein the stator core has a back yoke and a plurality of teeth radially extending from the back yoke to the rotor side, and a relationship of 0.905<Din/Dout<0.938 is satisfied, where Dout is an outer diameter of the back yoke and Din is an inner diameter of the back yoke.

10. A rotating electric machine comprising:
a stator having an armature coil wound on a stator core; and
a rotor provided rotatably and having a field coil configured to be energized via brushes,
wherein
the rotor includes:
a field core having a cylindrical boss portion on which the field coil is wound and a plurality of claw-shaped magnetic pole portions located on the stator side of the boss portion, the claw-shaped magnetic pole portions respectively forming magnetic poles polarities of which are alternately different in a circumferential direction; and
a plurality of permanent magnets each of which is arranged between one circumferentially-adjacent pair of the claw-shaped magnetic pole portions with its axis of easy magnetization oriented in the circumferential direction, each of the permanent magnets having magnetic poles formed therein so as to match the polarities induced in the pair of claw-shaped magnetic pole portions by magnetomotive force of the field coil,
wherein
a d-axis magnetic circuit and a magnet magnetic circuit share a magnetic path in at least parts thereof,
along the d-axis magnetic circuit, magnetic flux generated by the magnetomotive force of the field coil flows through the boss portion, one pair of the claw-shaped magnetic pole portions and the stator core,
along the magnet magnetic circuit, magnetic flux generated by magnetic force of a corresponding one of the permanent magnets flows,
a relationship of Ast>Af is satisfied, where Ast is a magnetic path cross-sectional area of the stator and Af is a magnetic path cross-sectional area of the rotor, and
a relationship of Prt<Pst is satisfied when the rotor is under load, where Prt is permeance of the d-axis magnetic circuit and Pst is permeance of a q-axis magnetic circuit, the q-axis magnetic circuit being formed by electric current flowing in the armature coil and extending through a q axis that is located at a position offset from the d axis by 90° in electrical angle.

11. A rotating electric machine comprising:
a stator having an armature coil wound on a stator core; and
a rotor provided rotatably and having a field coil configured to be energized via brushes,
wherein
the rotor includes:
a field core having a cylindrical boss portion on which the field coil is wound and a plurality of claw-shaped magnetic pole portions located on the stator side of the boss portion, the claw-shaped magnetic pole portions respectively forming magnetic poles polarities of which are alternately different in a circumferential direction; and
a plurality of permanent magnets each of which is arranged between one circumferentially-adjacent pair of the claw-shaped magnetic pole portions with its axis of easy magnetization oriented in the circumferential direction, each of the permanent magnets having magnetic poles formed therein so as to match the polarities induced in the pair of claw-shaped magnetic pole portions by magnetomotive force of the field coil,
wherein
a d-axis magnetic circuit and a magnet magnetic circuit share a magnetic path in at least parts thereof,
along the d-axis magnetic circuit, magnetic flux generated by the magnetomotive force of the field coil flows through the boss portion, one pair of the claw-shaped magnetic pole portions and the stator core, along the magnet magnetic circuit, magnetic flux generated by magnetic force of a corresponding one of the permanent magnets flows, a relationship of Ast>Af is satisfied, where Ast is a magnetic path cross-sectional area of the stator and Af is a magnetic path cross-sectional area of the rotor, the stator core has a back yoke and a plurality of teeth radially extending from the back yoke to the rotor side, and a relationship of 0.905<Din/Dout<0.938 is satisfied, where Dout is an outer diameter of the back yoke and Din is an inner diameter of the back yoke.

* * * * *